(12) United States Patent
Yeh et al.

(10) Patent No.: US 12,298,512 B2
(45) Date of Patent: May 13, 2025

(54) IMAGE DISPLAY SYSTEMS FOR EYEBOX EXPANSION AND METHODS OF MAKING THE SAME

(71) Applicant: HES IP HOLDINGS, LLC, Austin, TX (US)

(72) Inventors: Feng-Chun Yeh, Taipei (TW); Guo-Hsuan Chen, Taichung (TW); Pin Chang, Hsinchu (TW)

(73) Assignee: Oomii Inc., Grand Cayman (KY)

( * ) Notice: Subject to any disclaimer, the term of this patent is extended or adjusted under 35 U.S.C. 154(b) by 432 days.

(21) Appl. No.: 17/920,673

(22) PCT Filed: Jun. 21, 2021

(86) PCT No.: PCT/US2021/038318
§ 371 (c)(1),
(2) Date: Oct. 21, 2022

(87) PCT Pub. No.: WO2021/258078
PCT Pub. Date: Dec. 23, 2021

(65) Prior Publication Data
US 2023/0168513 A1      Jun. 1, 2023

Related U.S. Application Data

(60) Provisional application No. 63/085,172, filed on Sep. 30, 2020, provisional application No. 63/041,740, filed on Jun. 19, 2020.

(51) Int. Cl.
*G02B 27/01* (2006.01)
*G02B 27/00* (2006.01)

(52) U.S. Cl.
CPC ...... *G02B 27/0172* (2013.01); *G02B 27/0093* (2013.01); *G02B 2027/0123* (2013.01);
(Continued)

(58) Field of Classification Search
None
See application file for complete search history.

(56) References Cited

U.S. PATENT DOCUMENTS

| 4,953,961 A | 9/1990 | Ubhayakar |
| 6,454,411 B1 | 9/2002 | Trumbull |

(Continued)

FOREIGN PATENT DOCUMENTS

| CN | 105527710 A | 4/2016 |
| CN | 106537290 A | 3/2017 |

(Continued)

OTHER PUBLICATIONS

European Search Report, dated Jun. 10, 2024, in a counterpart EP patent application, No. EP 21824746.8.

(Continued)

*Primary Examiner* — Jyotsna V Dabbi
(74) *Attorney, Agent, or Firm* — Chen Yoshimura LLP

(57) ABSTRACT

Disclosed are systems and methods for expanding eyebox for a viewer, such as for the near eye display applying retinal projecting technologies from a head wearable device such as smart glasses. The system includes at least one image projector and at least one optical duplicator, where the optical duplicator is used to perform a light split to generate multiple instances of an incident light signal to achieve eyebox expansion for the viewer. An alternative system includes at least one image projector and at least one optical reflector, where the optical reflector is moved to perform a time split to redirect multiple light signals at different angles of incidence to achieve eyebox expansion for the viewer.

15 Claims, 19 Drawing Sheets

(52) U.S. Cl.
CPC ............... *G02B 2027/0134* (2013.01); *G02B 2027/0178* (2013.01); *G02B 2027/0187* (2013.01); *G02B 2207/101* (2013.01)

(56) References Cited

U.S. PATENT DOCUMENTS

| | | | |
|---|---|---|---|
| 10,467,770 | B2 | 11/2019 | Sato et al. |
| 10,554,940 | B1 | 2/2020 | Ghazaryan |
| 11,054,650 | B2* | 7/2021 | Fujimaki .............. G02B 27/017 |
| 11,079,601 | B2 | 8/2021 | Greenberg |
| 11,256,092 | B2 | 2/2022 | Shamir et al. |
| 11,325,330 | B2 | 5/2022 | Wong et al. |
| 2002/0024708 | A1 | 2/2002 | Lewis et al. |
| 2002/0122217 | A1 | 9/2002 | Nakajima |
| 2002/0180868 | A1 | 12/2002 | Lippert et al. |
| 2004/0233275 | A1 | 11/2004 | Tomita |
| 2008/0117289 | A1 | 5/2008 | Schowengerdt et al. |
| 2011/0032706 | A1 | 2/2011 | Mukawa |
| 2011/0273722 | A1 | 11/2011 | Charny et al. |
| 2012/0002163 | A1 | 1/2012 | Neal |
| 2012/0056799 | A1 | 3/2012 | Solomon |
| 2013/0127980 | A1 | 5/2013 | Haddick et al. |
| 2015/0169070 | A1 | 6/2015 | Harp et al. |
| 2015/0324568 | A1 | 11/2015 | Publicover et al. |
| 2015/0326570 | A1 | 11/2015 | Publicover et al. |
| 2015/0338915 | A1 | 11/2015 | Publicover et al. |
| 2016/0004908 | A1 | 1/2016 | Lundberg |
| 2016/0062459 | A1 | 3/2016 | Publicover et al. |
| 2016/0085302 | A1 | 3/2016 | Publicover et al. |
| 2016/0150201 | A1 | 5/2016 | Kilcher et al. |
| 2016/0178908 | A1 | 6/2016 | Dobschal et al. |
| 2016/0238845 | A1 | 8/2016 | Alexander et al. |
| 2016/0246441 | A1 | 8/2016 | Westerman et al. |
| 2016/0274660 | A1 | 9/2016 | Publicover et al. |
| 2016/0377865 | A1 | 12/2016 | Alexander et al. |
| 2017/0027651 | A1 | 2/2017 | Esterberg |
| 2017/0068091 | A1 | 3/2017 | Greenberg |
| 2017/0078651 | A1 | 3/2017 | Russell |
| 2017/0102545 | A1* | 4/2017 | Hua ...................... G06T 19/006 |
| 2017/0235931 | A1 | 8/2017 | Publicover et al. |
| 2017/0285343 | A1 | 10/2017 | Belenkii et al. |
| 2017/0367651 | A1 | 12/2017 | Tzvieli et al. |
| 2018/0017815 | A1 | 1/2018 | Chumbley et al. |
| 2018/0081322 | A1 | 3/2018 | Robbins et al. |
| 2018/0091805 | A1 | 3/2018 | Liang et al. |
| 2018/0157317 | A1 | 6/2018 | Richter et al. |
| 2018/0182174 | A1 | 6/2018 | Choi |
| 2018/0185665 | A1 | 7/2018 | Osterhout et al. |
| 2018/0246336 | A1 | 8/2018 | Greenberg |
| 2018/0249150 | A1 | 8/2018 | Takeda et al. |
| 2018/0252926 | A1 | 9/2018 | Alexander et al. |
| 2018/0262758 | A1 | 9/2018 | El-Ghoroury et al. |
| 2018/0284441 | A1 | 10/2018 | Cobb |
| 2019/0018479 | A1 | 1/2019 | Minami |
| 2019/0064435 | A1 | 2/2019 | Karafin et al. |
| 2019/0084419 | A1 | 3/2019 | Suzuki et al. |
| 2019/0121132 | A1 | 4/2019 | Shamir et al. |
| 2019/0172216 | A1 | 6/2019 | Ninan et al. |
| 2019/0187473 | A1 | 6/2019 | Tomizawa et al. |
| 2019/0222830 | A1 | 7/2019 | Edwin et al. |
| 2019/0271845 | A1 | 9/2019 | Cormier |
| 2019/0281279 | A1 | 9/2019 | Peuhkurinen et al. |
| 2019/0285897 | A1 | 9/2019 | Topliss et al. |
| 2019/0293939 | A1 | 9/2019 | Sluka |
| 2019/0320165 | A1 | 10/2019 | French et al. |
| 2019/0361250 | A1 | 11/2019 | Lanman et al. |
| 2020/0033595 | A1 | 1/2020 | Stegelmeier |
| 2020/0064633 | A1 | 2/2020 | Maimone |
| 2020/0097065 | A1 | 3/2020 | Iyer et al. |
| 2020/0117006 | A1 | 4/2020 | Kollin et al. |
| 2020/0138518 | A1 | 5/2020 | Lang |
| 2020/0186787 | A1* | 6/2020 | Cantero Clares .... H04N 13/106 |
| 2020/0241650 | A1 | 7/2020 | Kramer et al. |
| 2021/0003900 | A1 | 1/2021 | Chen |
| 2021/0055555 | A1 | 2/2021 | Chi et al. |
| 2021/0120222 | A1 | 4/2021 | Holz et al. |
| 2021/0278671 | A1 | 9/2021 | Hsiao et al. |
| 2022/0311992 | A1 | 9/2022 | Lai et al. |

FOREIGN PATENT DOCUMENTS

| | | | |
|---|---|---|---|
| CN | 107438796 | A | 12/2017 |
| CN | 108427498 | A | 8/2018 |
| CN | 109073901 | A | 12/2018 |
| CN | 109716244 | A | 5/2019 |
| CN | 110168427 | A | 8/2019 |
| JP | H4-501927 | A | 4/1992 |
| JP | H08-166556 | A | 6/1996 |
| JP | H09-105885 | A | 4/1997 |
| JP | 2004-527793 | A | 9/2004 |
| JP | 2007-121581 | A | 5/2007 |
| JP | 2010-117542 | A | 5/2010 |
| JP | 2011-13688 | A | 1/2011 |
| JP | 2016-180939 | A | 10/2016 |
| JP | 2017-056933 | A | 3/2017 |
| JP | 2018-508036 | A | 3/2018 |
| JP | 2018-132756 | A | 8/2018 |
| JP | 2018-533062 | A | 11/2018 |
| KR | 20120069133 | A | 6/2012 |
| TW | 201716827 | A | 5/2017 |
| TW | 201728959 | A | 8/2017 |
| TW | 201809214 | A | 3/2018 |
| TW | I619967 | B | 4/2018 |
| WO | 91/04508 | A2 | 4/1991 |
| WO | WO-2014041691 | A1 * | 3/2014 ............. B60K 35/00 |
| WO | 2016105281 | A | 6/2016 |
| WO | 2018/175265 | A1 | 9/2018 |
| WO | 2021092314 | A1 | 5/2021 |

OTHER PUBLICATIONS

Taiwanese Office Action, dated Aug. 23, 2022, in a counterpart or related Taiwanese patent application, No. TW 109141615.
European Search Report, dated Nov. 21, 2023, in a counterpart or related EP patent application, No. EP 20886006.4.
Taiwanese Office Action, dated Nov. 27, 2023, in a counterpart or related Taiwanese patent application, No. TW 112112456.
PCT/US2020/059317 International Search Report and Written Opinion issued on Feb. 5, 2021.
PCT/US2021/038318 International Search Report and Written Opinion issued on Sep. 24, 2021.
PCT/US2021/046078 International Search Report and Written Opinion issued on Nov. 24, 2021.
PCT/US2021/049171 International Search Report and Written Opinion issued on Dec. 6, 2021.
PCT/US2021/052750 International Search Report and Written Opinion issued on Dec. 28, 2021.
PCT/US2021/053048 International Search Report and Written Opinion issued on Jan. 14, 2022.
PCT/US2022/015717 International Search Report and Written Opinion issued on May 23, 2022.
PCT/US2022/013771 International Search Report and Written Opinion issued on Apr. 14, 2022.
U.S. Appl. No. 17/179,423 Final Rejection issued on Jul. 11, 2022.
U.S. Appl. No. 17/179,423 Non-Final Rejection issued on Jan. 21, 2022.
Kim, J et Al., "Foveated AR: Dynamically-Foveated Augmented Reality Display" pp. 1-15 [online]. Jul. 12, 2019, ACM Transactions on Graphics vol. 38, Issue 4 [Retrieved on Apr. 9, 2022]. Retrieved from the internet <url: https://dl.acm.org/doi/10.1145/3306346.3322987>; DOI: https://doi.org/10.1145/3306346.3322987.
PCT/US2021/038318 International Preliminary Report issued on Jul. 28, 2022.
Taiwanese Office Action, dated Aug. 14, 2023, in a counterpart Taiwanese patent application, No. TW 110122655.
IPRP in the PCT application No. PCT/US2021/052750, dated Dec. 6, 2022.

* cited by examiner

IMAGE DISPLAY SYSTEMS FOR EYEBOX EXPANSION AND METHODS OF MAKING THE SAME

RELATED APPLICATIONS

This application claims the benefit of the provisional application 63/041,740, filed on Jun. 19, 2020, titled "METHODS AND SYSTEMS FOR EYEBOX EXPANSION", and the provisional application 63/085,172, filed on Sep. 30, 2020, titled "SYSTEMS AND METHODS FOR PROJECTING VIRTUAL IMAGES WITH MULTIPLE DEPTHS", and incorporated herein by reference at their entireties.

In addition, the PCT international application PCT/US20/59317, filed on Nov. 6, 2020, titled "SYSTEM AND METHOD FOR DISPLAYING AN OBJECT WITH DEPTHS", and the U.S. application Ser. No. 17/179,423, filed on Feb. 19, 2021, titled "HEAD WEARABLE DEVICE WITH ADJUSTABLE IMAGE SENSING MODULES AND ITS SYSTEM", are incorporated herein by reference at their entireties.

BACKGROUND OF THE INVENTION

Field of the Invention

The present disclosure relates generally to image display systems for eyebox expansion and the methods of making the same, in particular, to systems and methods applying either the principle of "light-split" or the principle of "time-split" to expand an eyebox for a viewer.

Description of Related Art

One of the key challenges in the design of head wearable AR/VR devices is to minimize the physical size of the devices, while maintaining sufficient visual quality, view angle, and view position. The range of view position over which the images provided by the device is visible to the viewer is referred to as the "eyebox." The size and geometry of the eye box can greatly affect the user experience. For example, if the eye box is too small, the viewer may not be able to see the image produced by the head wearable AR/VR device when the sightline of the viewer deviates from the direction of the incoming image by a relatively small amount. The expansion of eye box (in other words, increasing the range or number of view positions of the images provided by a head wearable AR/VR device) is often achieved via optical means. However, expanding eyebox often involves providing additional bulky optical components to the head wearable AR/VR device. Therefore, it is desirable to design a system and a method for expanding eyebox without sacrificing the user experience and affecting the physical size of the head wearable AR/VR device.

SUMMARY

An object of the present disclosure is to provide image display systems and methods to expand eyebox for a viewer, including (but not limited to) for the near eye display applying retinal projecting technologies from a head wearable device such as smart glasses. This disclosure includes two embodiments.

The first embodiment applying a principle of "light-split" comprises an optical duplicator to generate multiple instances of an incident light signal to achieve eyebox expansion for a viewer. An image display system of the first embodiment includes a first image projector, a first optical duplicator, and a first combiner. The first image projector generates multiple light signals for a first image. The first optical duplicator receives a light signal generated by the first image projector, duplicate the light signal into N nonparallel instances, and redirect respective ones of N instances of the light signal towards a first combiner. N is an integer greater than 1. The first combiner is positioned between the first optical duplicator and an eye of the viewer, and arranged to receive and converge each one of the N nonparallel instances of the light signal respectively to N view points within an eyebox of the viewer's eye. The image display system may further include a second image projector, a second optical duplicator, and a second combiner which function in about the same manner to expand an eyebox for the other eye of the viewer. Thus, the image display system may expand the eyebox concurrently for both the viewer's right eye and left eye.

The second embodiment applying a principle of "time-split" comprises an optical reflector moving to redirect multiple light signals at a different angle of incidence to achieve eyebox expansion for a viewer. An image display system of the second embodiment includes a first image projector, a first optical reflector, and a first combiner. The first image projector generates multiple light signals for a first image. The first optical reflector receives the multiple light signals generated by the first image projector, and moves to redirect the multiple light signals towards a first combiner. The moving of the first optical reflector causes the multiple light signals arrives the first combiner at a different angle of incidence. The first combiner, positioned between the first optical reflector and an eye of the viewer, is arranged to receive and converge the multiple light signals to a first view area of the viewer's eye to expand an eyebox of the viewer's eye. In addition, a moving frequency of the first optical reflector is adjusted based on a projecting frequency of the first image projector so that the multiple light signals of the first image are projected to the first view area of the viewer's eye within the time period of persistence of vision. The image display system may further include a second image projector, a second optical reflector, and a second combiner which function in about the same manner to expand an eyebox for the other eye of the viewer. Thus, the image display system may expand the eyebox concurrently for both the viewer's right eye and left eye.

In both the first embodiment and the second embodiment, the image display system for both eyes of a viewer may be arranged to display an object with depths. The light signal redirected from the second combiner is a first redirected right light signal. A corresponding light signal redirected from the first combiner is a first redirected left light signal. The first redirected right light signal and the first redirected left light signal are perceived by the viewer to display a first virtual binocular pixel of an object with a first depth that is related to a first angle between the first redirected right light signal and the corresponding first redirected left light signal. In general, the first depth is determined by the relative horizontal distance between the first redirected right light signal and the corresponding first redirected left light signal.

Also in the application of AR and MR, an image display system may further include a support structure that is wearable on a head of the viewer. The first image projector, the second image projector, the first optical duplicator, and the second optical duplicator for the first embodiment (the first optical reflector and the second optical reflector for the second embodiment), the first combiner, and the second combiner are carried by the support structure. In one embodiment, the system is a head wearable device, in particular a pair of glasses, such as smart glasses. In this circumstance, the support structure may be a frame with or without lenses of the pair of glasses. The lenses may be prescription lenses used to correct nearsightedness, farsightedness, etc.

Additional features and advantages of the disclosure will be set forth in the descriptions that follow, and in part will be apparent from the descriptions, or may be learned by practice of the disclosure. The objectives and other advantages of the disclosure will be realized and attained by the structure and method particularly pointed out in the written description and claims thereof as well as the appended drawings. It is to be understood that both the foregoing general description and the following detailed description are exemplary and explanatory and are intended to provide further explanation of the invention as claimed.

DETAILED DESCRIPTION OF PREFERRED EMBODIMENTS

Figure 1A:
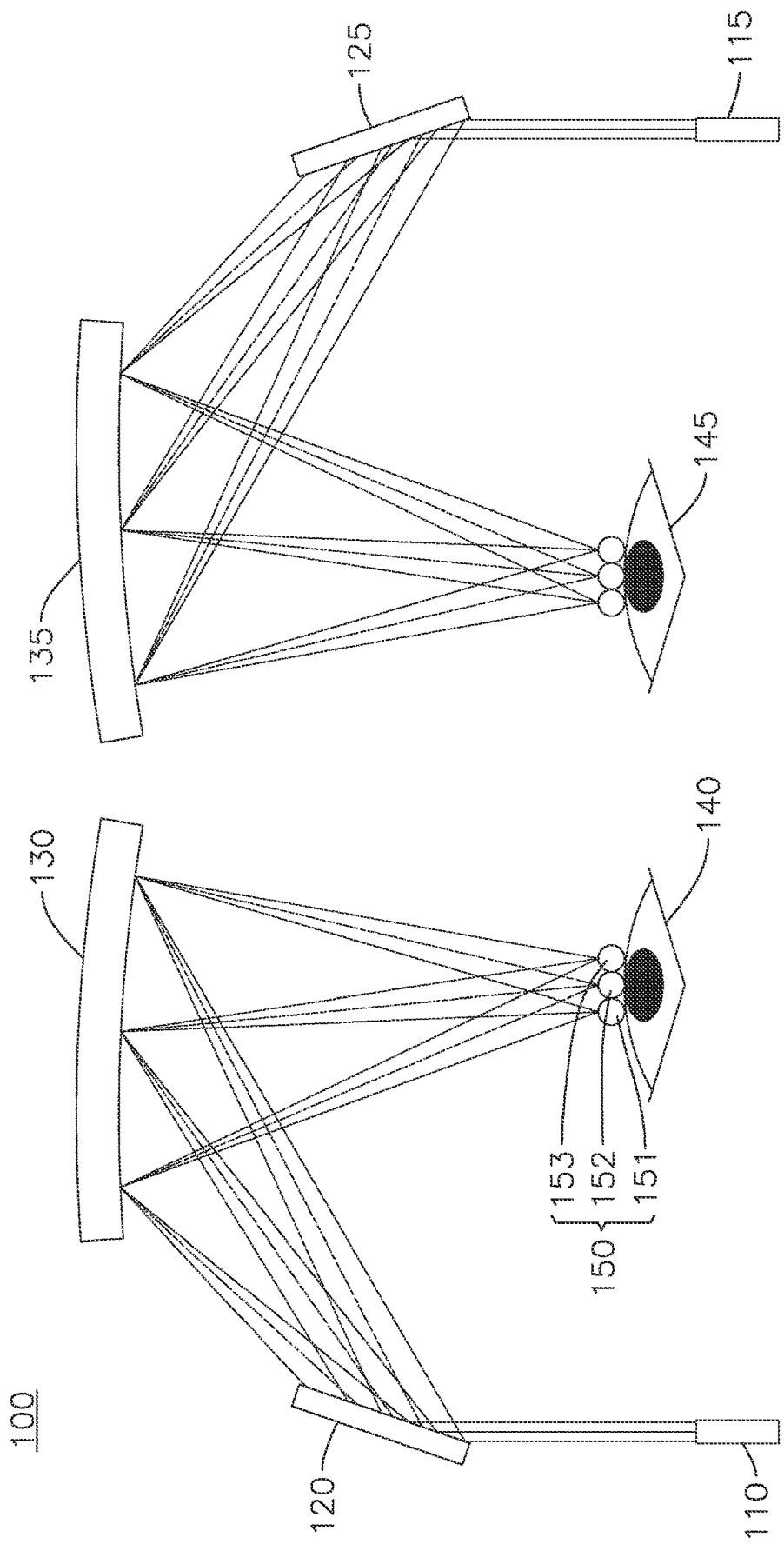
FIG. 1A is a schematic diagram illustrating an embodiment of an image display system with a first optical duplicator in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The present disclosure relates to one or more methods, systems, and apparatuses, to expand eyebox of image display, including (but not limited to) for the near eye display applying retinal projecting technologies from a head wearable device such as smart glasses. This disclosure includes two embodiments. Descriptions about the first embodiment may be applicable to the second embodiment, and vice versa. The first embodiment applying a principle of "light-split" comprises an optical duplicator to generate multiple instances of an incident light signal to achieve eyebox expansion for a viewer. An image display system of the first embodiment includes a first image projector, a first optical duplicator, and a first combiner. The first image projector generates multiple light signals for a first image. The first optical duplicator receives a light signal generated by the first image projector, duplicate the light signal into N nonparallel instances, and redirect respective ones of N instances of the light signal towards a first combiner. N is an integer greater than 1. The first combiner is positioned between the first optical duplicator and an eye of the viewer, and arranged to receive and converge each one of the N nonparallel instances of the light signal respectively to N view points within an eyebox of the viewer's eye. The image display system may further include a second image projector, a second optical duplicator, and a second combiner which function in about the same manner to expand an eyebox for the other eye of the viewer. Thus, the image display system may expand the eyebox concurrently for both the viewer's right eye and left eye.

The second embodiment applying a principle of "time-split" comprises an optical reflector moving to redirect multiple light signals at a different angle of incidence to achieve eyebox expansion for a viewer. An image display system of the second embodiment includes a first image projector, a first optical reflector, and a first combiner. The first image projector generates multiple light signals for a first image. The first optical reflector receives the multiple light signals generated by the first image projector, and moves to redirect the multiple light signals towards a first combiner. The moving of the first optical reflector causes the multiple light signals arrives the first combiner at a different angle of incidence. The first combiner, positioned between the first optical reflector and an eye of the viewer, is arranged to receive and converge the multiple light signals to a first view area of the viewer's eye to expand an eyebox of the viewer's eye. In addition, a moving frequency of the first optical reflector is adjusted based on a projecting frequency of the first image projector so that the multiple light signals of the first image are projected to the first view area of the viewer's eye within the time period of persistence of vision. The image display system may further include a second image projector, a second optical reflector, and a second combiner which function in about the same manner to expand an eyebox for the other eye of the viewer. Thus, the image display system may expand the eyebox concurrently for both the viewer's right eye and left eye.

In both the first embodiment and the second embodiment, the image display system for both eyes of a viewer may be arranged to display an object with depths. The light signal redirected from the second combiner is a first redirected right light signal. A corresponding light signal redirected from the first combiner is a first redirected left light signal. The first redirected right light signal and the first redirected left light signal are perceived by the viewer to display a first virtual binocular pixel of an object with a first depth that is related to a first angle between the first redirected right light signal and the corresponding first redirected left light signal. In general, the first depth is determined by the relative horizontal distance between the first redirected right light signal and the corresponding first redirected left light signal.

I. First Embodiment

In the first embodiment, as shown in FIG. 1A, an image display system 100 comprises a first image projector 110, a first optical duplicator 120, and a first combiner 130. By applying the principle of "light-split," the first embodiment uses the first optical duplicator 120 to receive light signals of a first image and then to generate multiple instances of the light signals which are respectively converged to multiple view points (e.g. 151, 152, 153) for expanding an eyebox 150 of a viewer's eye. An eyebox conventionally may contains only one view point. With this invention, an eyebox may be expanded to contain multiple view points. One view point may be separated from, abutted on, or overlapped with the adjacent view point. The eyebox is the area from which a viewer's eye 140 can see a full image. In other words, as long as the viewer's eye moves within the eyebox, the viewer can see a full image. The image display system 100 can expand an eyebox for each of a viewer's eye.

Figure 1B:
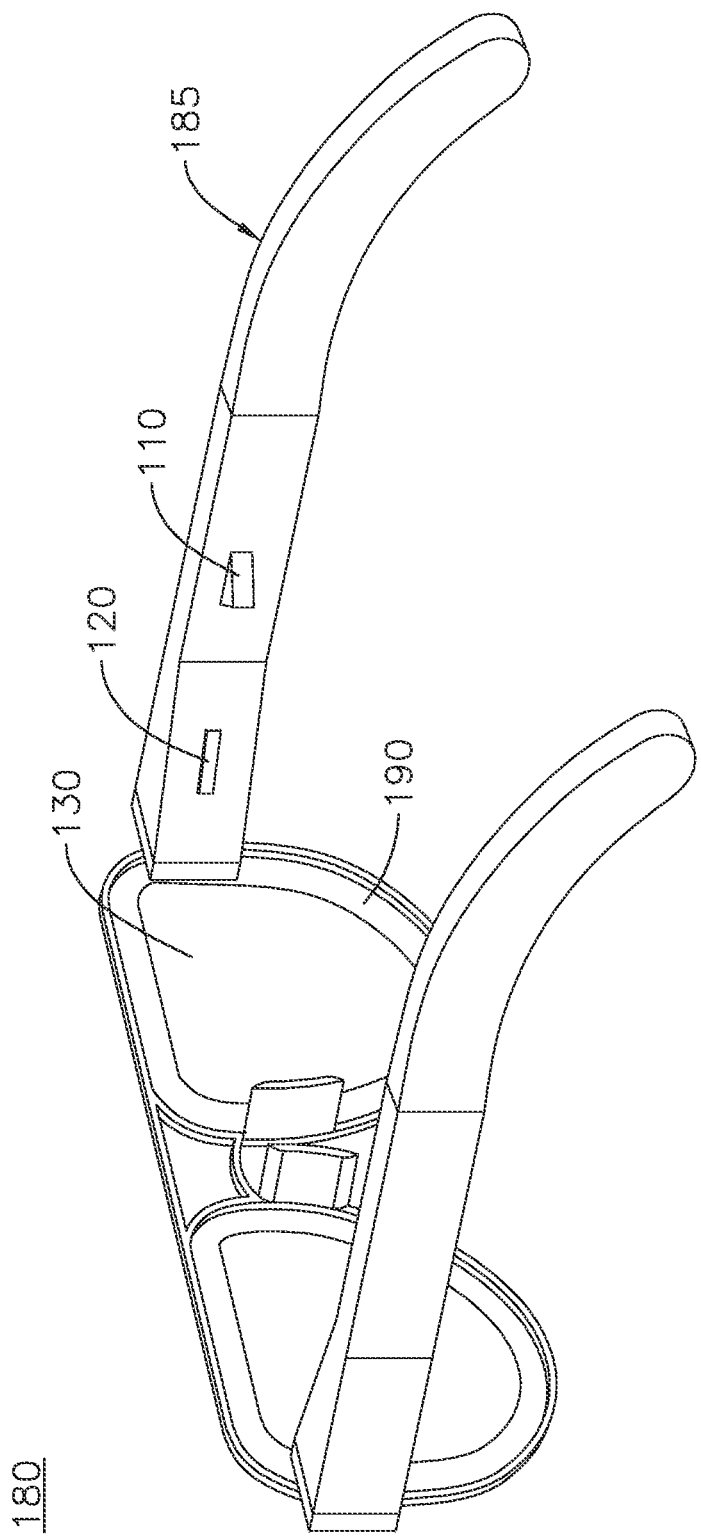
FIG. 1B is a schematic diagram illustrating an image display system carried by a pair of glasses in accordance with the present invention.

The image display system 100 may be carried by a head wearable device (HWD) which in one embodiment may be a pair of smart glasses 180 as shown in FIG. 1B. The pair of eyeglasses has a frame 185 and a pair of eyeglass lenses 190. The frame 185 carries the first image projector 110 and the first optical duplicator 120. The location of the first image projector 110 and the first optical duplicator 120 may be adjusted depending on the design of light paths. The eyeglass lens 190 carries the first combiner 130. In one embodiment, the first combiner 130 is integrated with the eyeglass lens 190 as one single component. In this situation, the image display system 100 may expand the eyebox for a wearer of the HWD. A viewer can see a full image from various view points (e.g. 151, 152, 153) within the eyebox. In addition, since the smart glasses 180 can be customized for the viewer, the interpupillary distance (IPD) can be adjusted for each viewer. People with ordinary skill in the art know that the image display system 100 can be configured to expand eyebox simultaneously for multiple viewers in other embodiments.

The first image projector 110 may use laser, light emitting diode ("LED") including mini and micro LED, organic light emitting diode ("OLED"), or superluminescent diode ("SLD"), liquid crystal on silicon ("LCoS"), liquid crystal display ("LCD"), or any combination thereof as its light source. In one embodiment, the first image projector 110 is a laser beam scanning projector (LBS projector) which may comprise the light source including a red color light laser, a green color light laser, and a blue color light laser, a light color modifier, such as Dichroic combiner and polarizing combiner, and a 2D adjustable reflector, such as a 2D electromechanical system ("MEMS") mirror. The LBS projector sequentially generates and scans light signals one by one to form a 2D image at a predetermined resolution, for example 1280×720 pixels per frame. Thus, one light signal of one pixel is generated and projected at a time towards the first optical duplicator 120. For the viewer to see such a 2D image from one eye, the LBS projector has to sequentially generate light signals for each pixel of the first image, for example 1280×720 light signals, within the time period of persistence of vision, for example 1/18 second. Thus, the time duration of each light signal is about 60.28 nanosecond.

In another embodiment, the first image projector 110 may be a digital light processing projector ("DLP projector") which can generate a 2D color image at one time. Texas Instrument's DLP technology is one of several technologies that can be used to manufacture the DLP projector. The whole 2D color image frame, which for example may comprise 1280×720 pixels, is simultaneously projected towards the first optical duplicator 120. Thus, after generating N nonparallel instances for one incident light signal, the first optical duplicator 120 is able to simultaneously redirect the N nonparallel instances of each of the multiple light signals of a frame, for example 1280×720 light signals, towards the first combiner 130 where N is an integer greater than 1.

When an LBS projector is used for the first image projector 110, the first optical duplicator 120, positioned and oriented in an optical path between the first image projector 110 and the first combiner 130, is arranged to receive simultaneously multiple light signals generated by the first image projector 110. For each received light signal, the first optical duplicator 120 reproduce the light signal into N nonparallel instances, and to redirect respective ones of N nonparallel instances of the light signal towards the first combiner 130, where N is an integer greater than 1. The first combiner 130, positioned and oriented between the first optical duplicator 120 and a viewer's eye 140, is to redirect each one of the N nonparallel instances of the light signal respectively to N view points (e.g. 151, 152, 153 . . . ) within the eyebox 150 of the viewer's eye. Again, one view point may be separated from, abutted on, or overlapped with the adjacent view point. People with ordinary skill in the art know how to determine the number of view points, the range of a view point, and the distance between the center of two adjacent view points considering the size of pupils, image resolution, the scanning speed of first image projector 110, and the interference effects among different instances of the light signals. The normal pupil size of adults varies from 2-4 mm in diameter in bright light, to 4-8 mm in diameter in the dark. In one embodiment, the distance between the center of two adjacent view points is about 2.6-3 mm.

The N nonparallel instances of the light signal from the first optical duplicator 120 may physically converge onto a point on the first combiner 130. In another embodiment, the N nonparallel instances of the light signal from the first optical duplicator 120 may be reflected at different points of the first combiner 130 and the light path extension of the reflected N nonparallel instances of the light signal virtually converge onto a point on a converging plane 135 which is at a distance d behind the first combiner 130 further away from a viewer's eye. In both embodiments, after reflection on the first combiner 130, the N nonparallel instances (e.g. first instance, second instance, and third instance) of the light signal of the same image pixel are re-directed to corresponding view points (e.g. first view point, second view point, and third view point) within the eyebox 150. Since, from a viewer's perspective, the N nonparallel instances of the light signal of the same image pixel either physically converge onto a point on the first combiner 130 or their light path extensions virtually converge onto a point on a converging plane 135, an image pixel is perceived by the viewer's eye as at the same location when the viewer's eye sees the image pixel from each of the first, second, and third view point. In other words, the viewer's eye sees the first instance, the second instance, and the third instance of the light signal representing that same image pixel as they all come from the same point on the first combiner 130 or the converging plane 135. Thus, the 2D image from the image display system 100 remains at the same location regardless of the view points from which the viewer's eye sees such 2D image. In addition, after the reflection on the first combiner 130, the corresponding instance (e.g. first instance, second instance, and third instance) of the light signal of different image pixels reflected from the first combiner 130 converges onto the corresponding view point (e.g. first view point, second view point, and third view point) within the eyebox 150.

Figure 2:
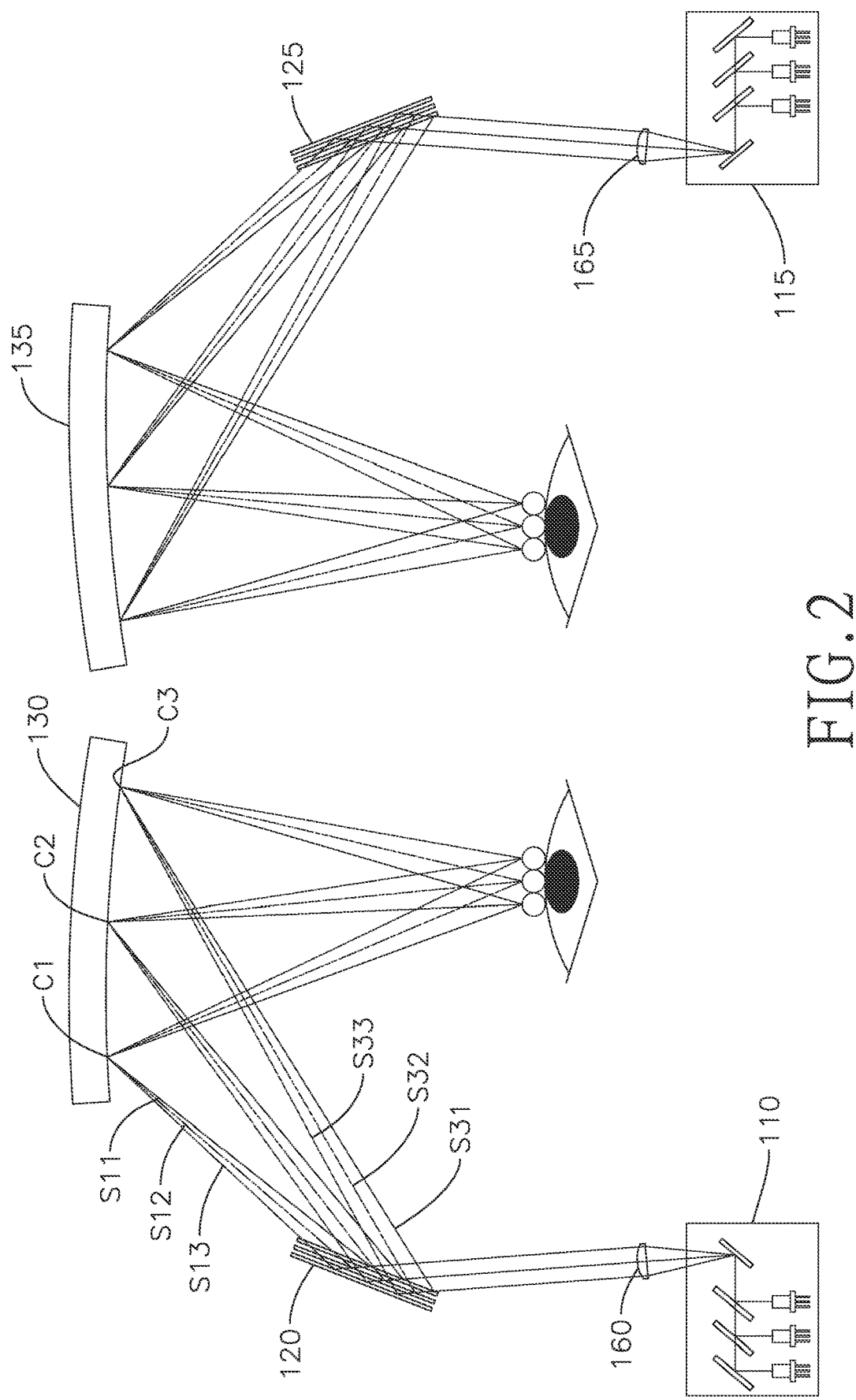
FIG. 2 is a schematic diagram illustrating an embodiment of an image display system with a beam splitter in accordance with the present invention.

As shown in FIG. 2, the image display system 100 may further comprise a first collimator 160 positioned between the first image projector 110 and the first optical duplicator 120 to cause the motion directions of the light signals to become more aligned (parallel) at a specific direction. In other words, the light signal of different pixels from the first image projector 110 may become approximately parallel to each other after passing through the first collimator 160. Thus, the first collimator 160 causes the angle of incidence of each light signal to the first optical duplicator 120 to be approximately the same. The first collimator 160 can be a curved lens or a convex lens.

The first optical duplicator 120 functions to duplicate an incident light signal into N nonparallel instances. In other words, after receiving one light signal, the first optical duplicator 120 generates N multiple instances of the light signal and redirect them to the first combiner 130 where N is an integer larger than 1. For example, N equals to 3, 4, or 5. The intensity of such N nonparallel instances is reduced from that of the incident light signal as a result of "light-split." The first optical duplicator 120 may be beam splitters, polarizing splitter, half-silvered mirrors, partial reflective mirror, dichroic mirrored prisms, dichroic or dielectric optical coatings. The first optical duplicator 120 may comprise at least two optical components to duplicate the incident light signal into at least two instances. Each of the optical component may be one lens, reflector, partial reflector, prism, mirror, or a combination of the aforementioned.

In one embodiment shown in FIG. 2, when N equals to three, the first optical duplicator 120 is a beam splitter comprising three optical components—two partial reflectors and one complete reflector, to split an incident light signal into three instances applying the principle of partial reflection. In another embodiment shown in FIG. 3, the first optical duplicator 120 is a polarizing beam splitter that splits an incident light signal into three instances applying the principle of polarization.

Figure 3:
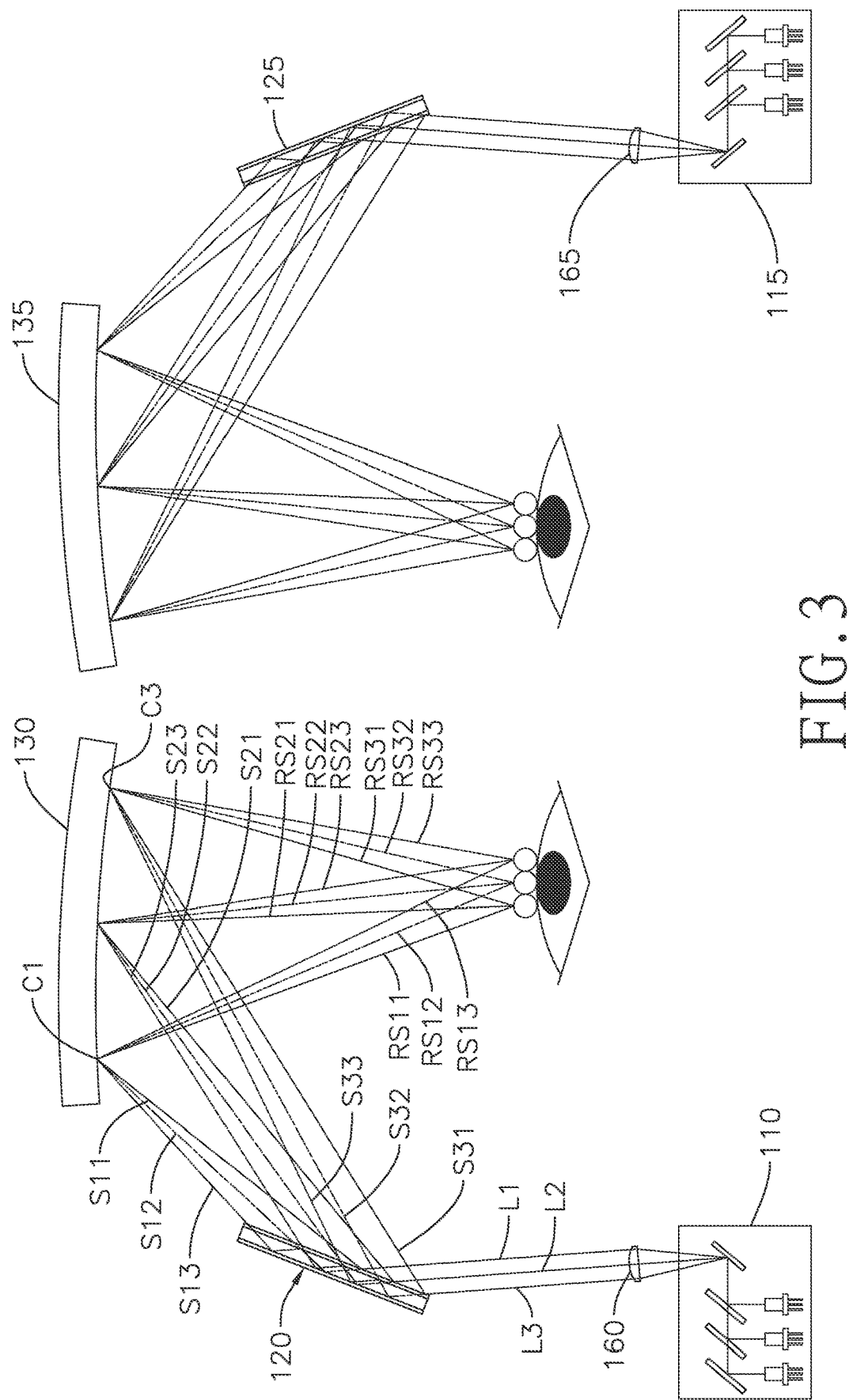
FIG. 3 is a schematic diagram illustrating an embodiment of an image display system with a polarizing beam splitter where N instances of a light signal converges on a first combiner in accordance with the present invention.

The first optical duplicator 120 may be configured to adjust the location, including direction and distance, where the N nonparallel instances of a light signal would converge. In FIGS. 2 and 3, the first instance (S11), the second instance (S12), and the third instance (S13) of the first light signal (L1) are converged onto point C1 of the first combiner 130. Similarly, the first instance (S31), second instance (S32), and third instance (S33) of the third light signal (L3) are converged onto point C3 of the first combiner 130. When the first light signal and the third light signal are respectively for the image pixel farthest to the left and the image pixel farthest to the right of the image, the distance between points C1 and C3 may be used for the field of view (FOV). In this embodiment, the viewer's FOV from a view point may cover approximately the whole area of the first combiner 130. Alternatively, the viewer's FOV from a view point may cover more than 80% of the area of the first combiner. In a conventional scenario generating parallel instances of a light signal, the area of a combiner has be divided for multiple view points, and thus, the viewer's FOV from a view point is substantially smaller than the FOV in this invention.

Figure 4:
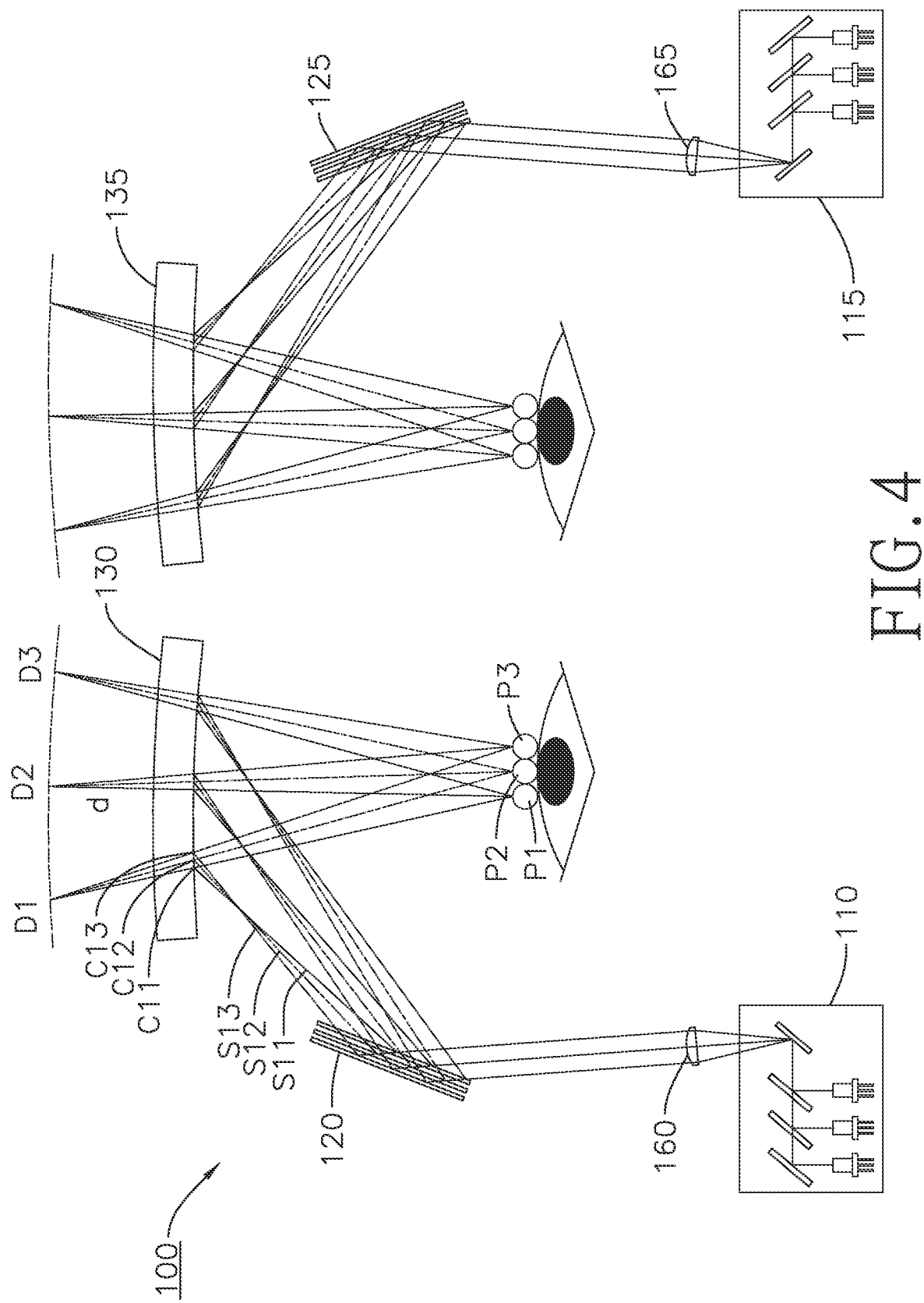
FIG. 4 is a schematic diagram illustrating an embodiment of an image display system where light path extensions of the reflected N nonparallel instances of a light signal virtually converge on a converging plane behind a first combiner in accordance with the present invention.

In another embodiment of the image display system 100 shown in FIG. 4, the first instance (S11), the second instance (S12), and the third instance (S13) of the first light signal (L1) are respectively reflected at points C11, C12, and C13 on the first combiner 130. However, the light path extensions of the reflected first instance (RS11), the redirected second instance (RS12), and the redirected third instance (RS13) of the first light signal (L1) are virtually converged onto point D1 of the converging plane 135 at a distance d behind the first combiner 130 further away from the viewer's eye. In this embodiment, because the light path extension of all instances of the light signal of each image pixel virtually converges onto one point on the converging plane 135, the viewer's eye perceives each image pixel (and the whole image) as if it is located on the same position of the converging plane 135 regardless of the view point from which the viewer's eye sees the image. This embodiment may be applied in augmented reality aid surgery (ARAS), in which an image, for example originally captured from computed tomography, generated by the image display system 100 is superimposed exactly on the corresponding portion of a patient in clinic. In some circumstances, the distance D behind the first combiner 130 may be around 30-40 cm.

The first combiner 130 may reflect the multiple instances of the light signal from the first optical duplicator 120 and converge the corresponding instance of each light signal into a respective view point with the eyebox of a viewer's eye. In one embodiment, the first combiner 130 is sufficiently optically transparent to allow environmental lights to pass through to the viewer's eye. As shown in FIGS. 2, 3, and 4, the first instance (solid line S11, S21, S31) of each of the three incident light signals (L1, L2, L3) from the first optical duplicator 120 are reflected and converged by the first combiner 130 onto the first view point P1. The second instance (dash-dotted line S12, S22, S32) of each of the three incident light signals (L1, L2, L3) from the first optical duplicator 120 are reflected and converged by the first combiner 130 onto the second view point P2. And the third instance (dotted line S13, S23, S33) of each of the three incident light signals (L1, L2, L3) from the first optical duplicator 120 are reflected and converged by the first combiner 130 onto the third view point P3. Regardless of whether the first instance, the second instance, and the third instance of each light signal from the first duplicator 120 are converged onto the first combiner 130, after reflection, the redirected first instance (RS11, RS21, RS31) of each of the three light signals (L1, L2, L3) from the first combiner 130 are converged onto the first view point P1. Although for the convenience the redirected first instances (RS11, RS21, RS31) of the three light signals (L1, L2, L3) are illustrated on the related figures as converged onto one point in the first view point P1 (151), these three first instances are actually projected to three slightly separated points on a retina of the viewer's eye since they represent three different image pixels. The same applies to all second instances and third instances of each light signal.

The first combiner 130 may be made of glasses or plastic materials like a lens, coated with certain materials such as metals to make it partially transparent and partially reflective. The first combiner 130 may be a holographic combiner but not preferred because the diffraction effects can cause multiple shadows and RGB displacement. In some embodiments, we may want to avoid using a holographic combiner.

As described above, the image display system 100 with the first image projector 110, the first optical duplicator 120, and the first combiner 130 may expand an eyebox for a viewer's eye. In one embodiment, the image display system 100 may further include a second image projector 115, a second optical duplicator 125, and a second combiner 135, which collectively function in substantially the same manner as the first image projector 110, the first optical duplicator 120, and the first combiner, to expand an eyebox for the other eye of the viewer. Similarly, the second image projector generates multiple light signals for a second image. The second optical duplicator receives a light signal generated by the second image projector, duplicate the light signal into M nonparallel instances, and redirect respective ones of M instances of the light signal towards the second combiner. M is an integer greater than 1. The second optical duplicator includes at least one element. The second combiner is positioned between the second optical duplicator and the other eye of the viewer, and arranged to receive and converge each one of the M nonparallel instances of the light signal respectively to M view points within an eyebox of the other eye of the viewer. In addition, the second image projector may have a structure similar to the first image projector. The second optical duplicator may have a structure similar to the first optical duplicator. The second combiner may have a structure similar to the first combiner. Thus, the image display systems 100 may expand the eyebox for both right eye and left eye of the viewer.

The image display system 100 may include a support structure wearable on a head of the viewer to carry the first image projector 110, the second image projector 115, the first optical duplicator 120, the second optical duplicator 125, the first combiner 130, and second combiner 135. The first combiner 130 and the second combiner 135 are positioned within a field of view of the viewer. Thus, in this embodiment, the image display system 100 is a head wearable device (HWD). In particular, as shown in FIG. 1B, the image display system is carried by a pair of glasses, which is referred to as smart glasses. In this situation, the support structure may be a frame of a pair of glasses with or without lenses. The lenses may be prescription lenses used to correct nearsightedness, farsightedness, etc. The first image projector 110 and the first optical duplicator 115 are carried by a right temple of the frame. The second image projector and the second optical duplicator are carried by a left temple of the frame. The first combiner may be carried by the right lens and the second combiner may be carried by the left lens. The carrying can be implemented in various manner. The combiner may be attached or incorporated to the lens by either a removable or a non-removable means. The combiner may be integratedly made with the lens, including prescription lens. When the support structure does not include lenses, the right combiner and the left combiner may be directly carried by the frame or rims.

All components and variations in the embodiments of the image display system 100 may be applied to the HWD. Thus, the HWD, including smart glasses, may further carry other components of the image display system, such as a control unit, a first collimator 160 and a second collimator 165. The first collimator 160 may be positioned between the first image projector and the first optical duplicator and the second collimator 165 may be positioned between the second image projector and the second optical duplicator. When the image display system 100 is implemented on smart eyeglasses. The lenses of the smart eyeglasses may have both dioptric property for correcting the viewer's eyesight and the function of a combiner. The smart eyeglasses may have lenses with prescribed degrees to fit the need of individuals who are near-sighted or far-sighted to correct their eyesight. In these circumstances, each of the lenses of the smart eyeglasses may comprise a dioptric unit and a combiner. The dioptric unit and the combiner can be integrally manufactured as one piece with the same or different type of material. The dioptric unit and the combiner can also be separately manufactured in two pieces and then assembled together. These two pieces can attach to each other but separable, for example with built-in magnetic material, or may be attached to each other permanently. In either situation, the combiner is provided on a side of the lens which is closer to the eyes of the viewer. If the lens is one piece, the combiner forms an inner surface of the lens. If the lens has two portions, the combiner forms the inner portion of the lens. The combiner both allows ambient light to pass through and reflects light signals generated by the image projectors to the viewer's eyes to form virtual images in the real environment. The combiner is designed to have appropriate curvature to reflect and to converge all the light signals from the optical duplicators into the pupils and then on the retinas of the eyes.

Figure 5A:
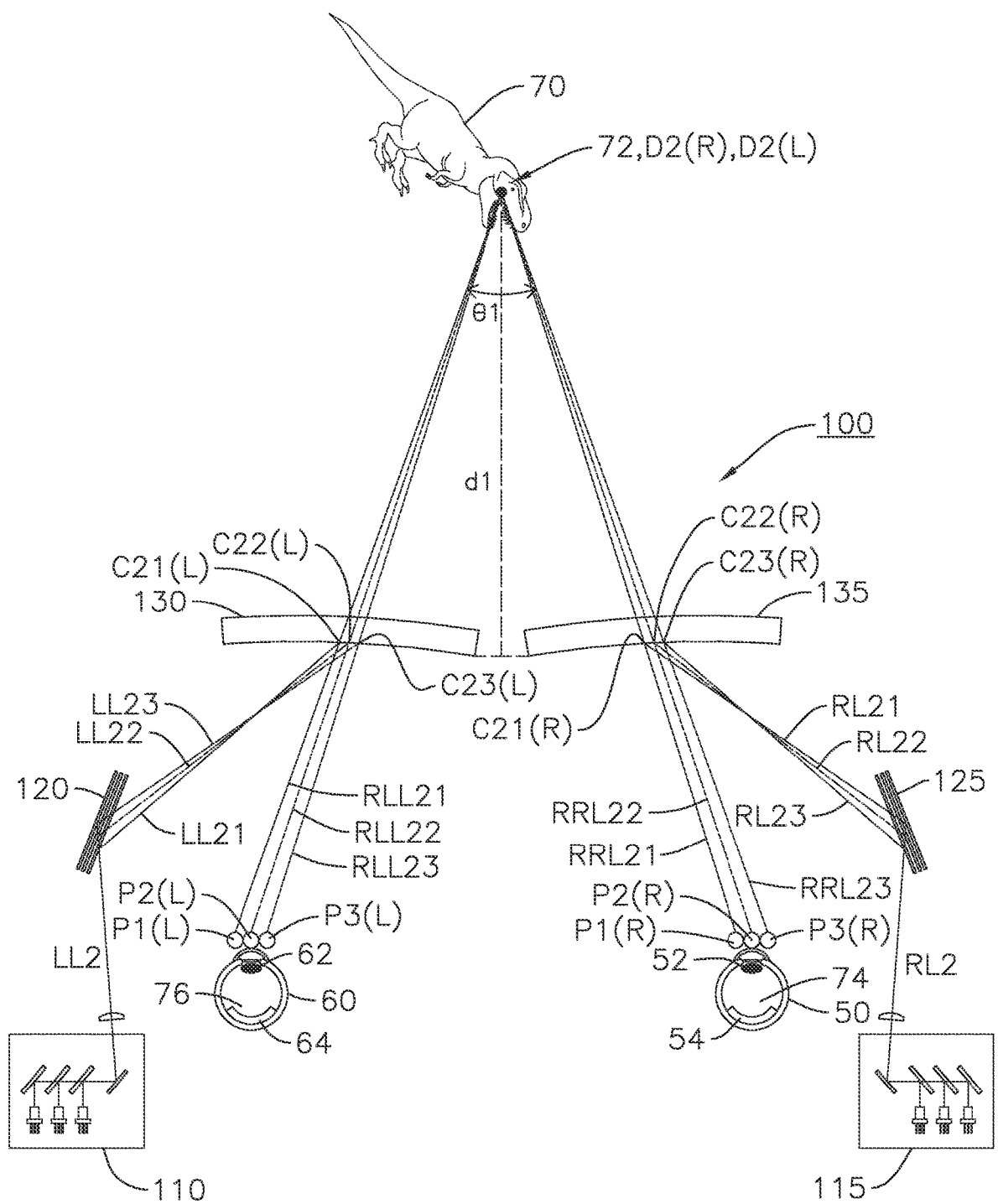
FIG. 5A is a schematic diagram illustrating an image display system for both eyes of a viewer to perceive an object with depths in accordance with the present invention.

In one embodiment as shown in FIG. 5A, the image display system 100 for both eyes of a viewer may be arranged to display an object with depths. Because the depth of the object is the same as the location both eyes of the viewer fixate, vergence-accommodation conflict (VAC) and focal rivalry can be avoided. The light signal redirected from the second combiner 135 is a first redirected right light signal (e.g. RRL21). A corresponding light signal redirected from the first combiner 130 is a first redirected left light signal (e.g. RLL21). The first redirected right light signal (e.g. RRL21) and the first redirected left light signal (e.g. RLL21) are perceived by the viewer to display a first virtual binocular pixel 72 of an object 70 with a first depth (d1) that is related to a first angle (θ1) between the light path extensions of the first redirected right light signal (e.g. RRL21) and the corresponding first redirected left light signal (e.g. RLL21). In general, the first depth is determined by the relative horizontal distance between the first redirected right light signal and the corresponding first redirected left light signal.

The image display system 100 shown in FIG. 5A has a first image projector 110, a first optical duplicator 120, a first combiner 130, a second image projector 115, a second optical duplicator 125, and a second combiner 135. The first image projector 110 generates a left light signal (LL2) towards the first optical duplicator 120 which then duplicates the left light signal into three instances (LL21, LL22, LL23) and redirects them towards the first combiner 130. The three instances of the left light signal are reflected by the first combiner 130 respectively at points C21(L), C22(L), and C23(L). The redirected three instances (RLL21, RLL22, RLL23) of the left light signal are respectively projected onto three left view points P1(L), P2(L), and P3(L), and then towards the retina of the viewer's left eye. The extension of the light paths of the three redirected instances of the left light signal virtually converges at a position D2(L) on a left converging plane at a distance d1 beyond the first combiner 130 further away from the viewer's eye.

Similarly, the second image projector 115 generates a right light signal (RL2) towards the second optical duplicator 125 which then duplicates the right light signal into three instances (RL21, RL22, RL23) and redirects them towards the second combiner 135. The three instances of the left light signal are reflected by the second combiner 135 respectively at points C21(R), C22(R), and C23(R). The redirected three instances (RRL21, RRL22, RRL23) of the right light signal are respectively projected onto three right view points P1(R), P2(R), and P3(R), and then towards a retina of the viewer's right eye. The extension of the light paths of the three redirected instances of the right light signal virtually converges at a position D2(R) on a right converging plane at a distance d1 beyond the second combiner 135 further away from the viewer's eye. The image display system 100 may be configured to make the position D2(L) the same as the position D2(R), which is the 3D location of a virtual binocular pixel 72 of an object the viewer perceives.

With the eyebox expansion, in this embodiment, the viewer's eyes may receive light signals from three pairs of view points—the first right view point P1(R) and the corresponding first left view point P1(L), the second right view point P2(R) and the corresponding second left view point P2(L), and the third right view point P3(R) and the corresponding third left view point P3(L). The viewer has a right eye 50 containing a right pupil 52 and a right retina 54, and a left eye 60 containing a left pupil 62 and a left retina 64. Thus, from the first pair of view points—the first right view point P1(R) and the corresponding first left view point P1(L), the viewer's eyes may receive the first instance of the redirected right light signal RRL21 and the corresponding first instance of the redirected left light signal RLL21 through the pupils and onto the retinas. As a result, the viewer perceives a first virtual binocular pixel 72 of an object displayed with a first depth (d1) that is related to a first angle (θ1) between the light path extensions of the first instance of the redirected right light signal (RRL21) and the corresponding first instance of the redirected left light signal (RLL21). Similarly, from the second pair of view points— the second right view point P2(R) and the corresponding second left view point P2(L), the viewer's eyes may receive the second instance of the redirected right light signal RRL22 and the corresponding second instance of the redirected left light signal RLL22 through the pupils onto the retinas. As a result, the viewer perceives the same first virtual binocular pixel 72 of the object displayed with a first depth (d1) that is related to a first angle (θ1) between the light path extensions of the second instance of the redirected right light signal (RRL22) and the corresponding second instance of the redirected left light signal (RLL22). The above description is applicable to the third pair of view points. The distance between each pair of view points is about the same because the interpupillary distance (IPD) of a viewer remains about the same when he/she moves.

Figure 5B:
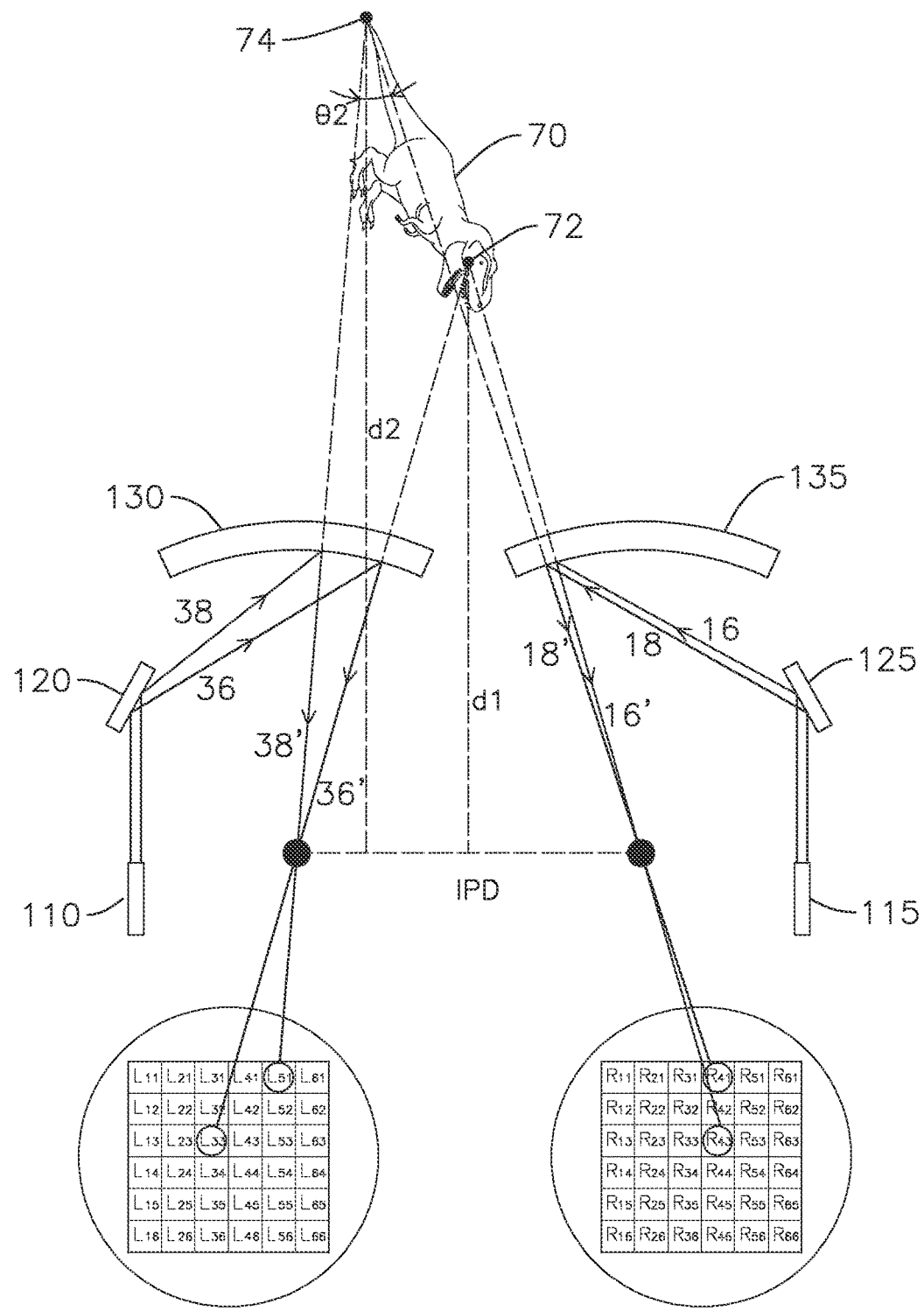
FIG. 5B is a schematic diagram illustrating an image display system for both eyes of a viewer to perceive an object with two virtual binocular pixels with depth in accordance with the present invention.

In an embodiment shown in FIG. 5B, an object, like the dinosaur 70, is perceived with multiple depths when, in addition to the first virtual binocular pixel 72 of the object, a second redirected right light signal 18' and a corresponding second redirected left light signal 38' are perceived by the viewer to display a second virtual binocular pixel 74 of the object with a second depth d2 that is related to a second angle Θ2 between the light path extensions of the second redirected right light signal 18' and the corresponding second redirected left light signal 38'. In FIG. 5B, to simply the drawing, only the first instance of each right light signal and each left light signal from the first optical duplicator 120 and the second optical duplicator 125 is illustrated. FIG. 5A already illustrates that the first optical duplicator and the second optical duplicator respectively generate three instances of the left light signal and the right light signal.

In FIG. 5B, the image of the dinosaur object 70 includes a first virtual binocular pixel 72 displayed at a first depth d1 and a second virtual binocular pixel 74 displayed at a second depth d2. The first angle between the first redirected right light signal 16' and the corresponding first redirected left light signal 36' is Θ1. The first depth d1 is related to the first angle Θ1. In particular, the first depth of the first virtual binocular pixel of the object can be determined by the first angle Θ1 between the light path extensions of the first redirected right light signal and the corresponding first redirected left light signal. As a result, the first depth D1 of the first virtual binocular pixel 72 can be calculated approximately by the following formula:

$$\operatorname{Tan}\left(\frac{\theta}{2}\right) = \frac{IPD}{2D}$$

The distance between the right pupil 52 and the left pupil 62 is interpupillary distance (IPD). Similarly, the second angle between the light path extensions of the second redirected right light signal 18' and the corresponding second redirected left light signal 38' is Θ2. The second depth d2 is related to the second angle Θ2. In particular, the second depth d2 of the second virtual binocular pixel 74 of the object can be determined approximately by the second angle Θ2 between the light path extensions of the second redirected right light signal and the corresponding second redirected left light signal by the same formula. Since the second virtual binocular pixel 74 is perceived by the viewer to be further away from the viewer (i.e. with larger depth) than the first virtual binocular pixel 72, the second angle Θ2 is smaller than the first angle Θ1.

Furthermore, the redirected first right light signal 16' and the corresponding redirected left light signal 36' together display a first virtual binocular pixel 72 with the first depth d1. In one embodiment, the redirected first right light signal 16' is not a parallax of the corresponding redirected first left light signal 36'. A parallax between the image received by the right eye and the image received by the left eye is used for a viewer to perceive a 3D image with depth because the right eye sees the same object from a view angle different from that of a left eye. Thus, both the redirected first right light signal 16' and the corresponding redirected first left light signal 36' may have the same view angle. However, in another embodiment, the right light signal and the corresponding left light signal for a virtual binocular pixel may display an image of different view angles (with parallax). In addition, one or both of the right light signal and the left light signal may be modified to present some 3D effects such as shadow.

As described above, the multiple right light signals are generated by the second image projector, duplicated by the second optical duplicator, redirected by the second combiner, and then directly scanned onto the right retina to form a right retina image on the right retina. Likewise, the multiple left light signals are generated by the first image projector, duplicated by the first optical duplicator, redirected by the first combiner, and then scanned onto the left retina to form a left retina image on the left retina. In an embodiment shown in FIG. 5B, a right retina image 80 contains 36 right pixels in a 6×6 array and a left retina image 90 also contains 36 left pixels in a 6×6 array. In another embodiment, a right retina image 80 contains 921,600 right pixels in a 1280×720 array and a left retina image 90 also contains 921,600 left pixels in a 1280×720 array. The image display system 100 is configured to generate multiple right light signals and corresponding multiple left light signals which respectively form the right retina image on the right retina and left retina image on the left retina. As a result, the viewer perceives a virtual binocular object with specific depths because of image fusion.

With reference to FIG. 5B, the first right light signal 16 from the second image projector 115 is duplicated by the second optical duplicator 125 and then reflected by the second combiner 135. The (first instance of the) first redirected right light signal 16', through the right pupil 52, arrives the right retina 54 of the viewer to display the right pixel R34. The corresponding (first instance of the) left light signal 36' from the first image projector 110 is duplicated by the first optical duplicator 120 and then reflected by the first combiner 110. The first redirected left light signal 36', through the left pupil 62, arrives the left retina 64 of the viewer to display the left retina pixel L33. In this embodiment, the first redirected right light signal and the corresponding first redirected left light signals are directed to approximately the same height of the retina of the viewer's both eyes. As a result of image fusion, a viewer perceives the virtual binocular object with multiple depths where the depths are determined by the angles of the multiple redirected right light signals and the corresponding multiple redirected left light signals for the same object. The angle between a redirected right light signal and a corresponding left light signal is determined by the relative horizontal distance of the right pixel and the left pixel. Thus, the depth of a virtual binocular pixel is inversely correlated to the relative horizontal distance between the right pixel and the corresponding left pixel forming the virtual binocular pixel. In other words, the deeper a virtual binocular pixel is perceived by the viewer, the smaller the relative horizontal distance at X axis between the right pixel and left pixel forming such a virtual binocular pixel is. For example, as shown in FIG. 5B, the second virtual binocular pixel 74 is perceived by the viewer to have a larger depth (i.e. further away from the viewer) than the first virtual binocular pixel 72. Thus, the horizontal distance between the second right pixel and the second left pixel is smaller than the horizontal distance between the first right pixel and the first left pixel on the retina images. Specifically, the horizontal distance between the second right pixel R41 and the second left pixel L51 forming the second virtual binocular pixel is four-pixel long. However, the distance between the first right pixel R43 and the first left pixel L33 forming the first virtual binocular pixel is six-pixel long.

As described before, this embodiment may be applied in augmented reality aid surgery (ARAS), in which an image, for example originally captured from computed tomography, generated by the image display system 100 is superimposed exactly on the corresponding portion of a patient in clinic. In some circumstances, the distance d1 behind the first combiner 130 may be around 30-40 cm. In this application, the depth of the 3D image may be fixed or limited within a relatively short distance.

When a DLP projector is used for the first image projector 110, the whole image, for example 1280×720 pixels per frame, is generated at one time and projected towards the first optical duplicator 120 simultaneously. Other than that, the above description is generally applied to the situation of using a DLP projector.

Figure 6:
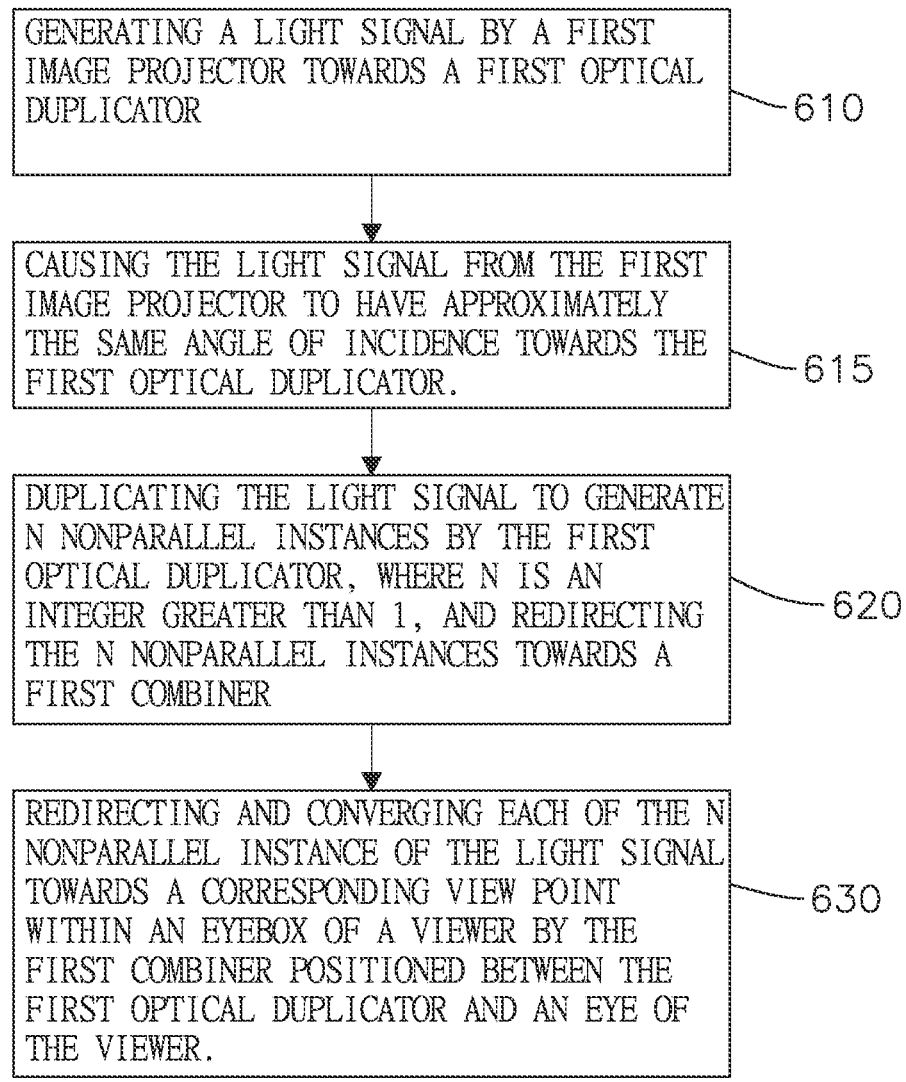
FIG. 6 is a flow chart illustrating an embodiment of processes for expanding an eyebox for a viewer's eye by an image display system with a first optical duplicator in accordance with the present invention.

FIG. 6 illustrates a method of expanding an eyebox of a viewer. At step 610, the first projector 110 generates a light signal towards a first optical duplicator. In one embodiment, the image projector 110 may be a laser beam scanning projector (LBS projector) which sequentially generates a light signal of an image pixel one by one. In another embodiment, the image projector 120 may be a DLP projector that simultaneously generates light signals of an image (for example a frame of 1280×720 pixels). In either embodiment, when the image projector 120 generates the light signals at high speed (e.g. 60 frames/second), the viewer can see a video smoothly due to persistence of vision.

At step 620, the first optical duplicator 120 receives the light signal and duplicates it to generate N nonparallel instances of the light signal, where N is an integer greater than 1. The first optical duplicator 120 also redirects the N nonparallel instances towards a first combiner 130. At step 630, the first combiner 130 redirects and converges each of the N nonparallel instance of the light signal towards a corresponding view point within an eyebox of a viewer by the first combiner. The first combiner 130 is positioned between the first optical duplicator and an eye of the viewer. The first optical duplicator 120 and the first combiner 130 are configured to converge the N nonparallel instances of each light signal. For example, the first nonparallel instance of each light signal is converged to the first view point and the second nonparallel instance of each light signal is converged to the second view point. The first optical duplicator 120 and the first combiner 130 are configured to realize one of at least the following two embodiments. In one embodiment, the N nonparallel instances of a light signal are physically converged onto one point on the first combiner 130. In another embodiment, the N nonparallel instances of the light signal from the first optical duplicator 120 are physically reflected by the first combiner 130 respectively at different points. After the reflection on the first combiner 130, the light path extensions of the N nonparallel instances of each light signal virtually converge at a position D1 at a distance d beyond the first combiner 130 further away from the viewer's eye.

In addition to the above three steps, in one embodiment, after step 610 and before step 620, the method further comprises a step 615. At step 615, a first collimator 160 causes the light signal of multiple image pixels generated by the first image projector 110 to have approximately the same angle of incidence towards the first optical duplicator 120. A first collimator may be positioned at the light path between the first image projector 110 and the first optical duplicator 120 to perform this function.

In sum, one feature of various image display systems described in first embodiment section is that the viewer's eye perceives the image/object (either 2D or 3D) generated from an image display system as if the image is located on the same position of the first combiner 130 or the converging plane 135 regardless of the view point from which the viewer's eye sees the image. In other words, when the viewer's eye moves from one view point to another view point within the eyebox, the viewer sees the full image/object at exactly the same location. In the situation of prior art, because, after the reflection of a combiner, the N instances of each light signal are redirected to the view points in parallel, the viewer would perceive the image moves when the viewer's eye moves from one view point to another view point within the eyebox.

Another feature is that almost the whole area of the first combiner 130 can be used for the field of view (FOV) when the N nonparallel instances of each light signal representing a pixel from the first optical duplicator 120 are converged to one point of the first combiner 130. In the prior art, the N instances of each light signal representing a pixel are respectively directed to different regions of a combiner so that, after the reflection by the combiner, such N instances of each light signal are redirected to the view points in parallel from different points on the combiner. Thus, only a smaller area of the combiner (about area of the combiner/N) can be used for the field of view.

II. Second Embodiment

Figure 7A:
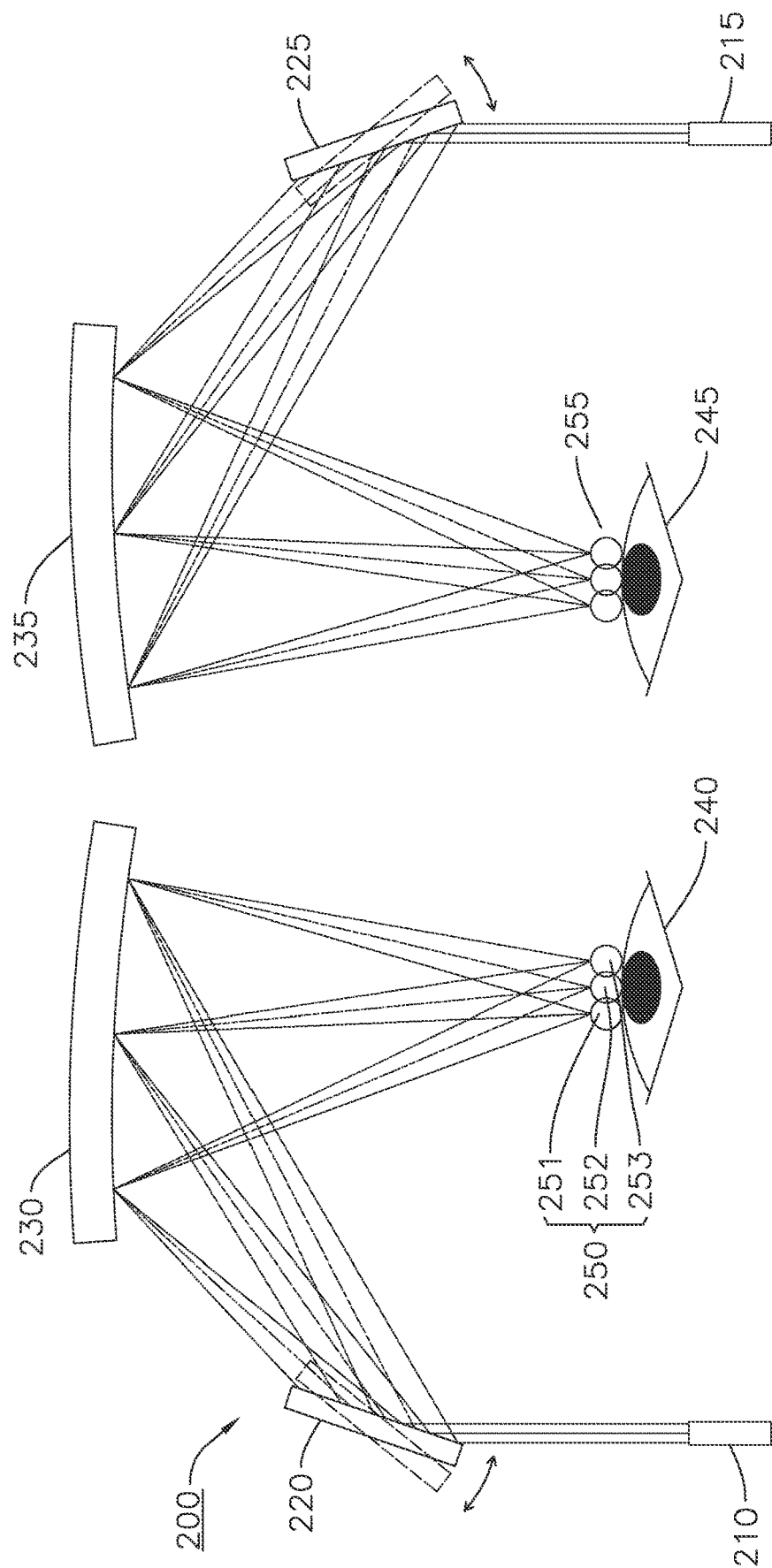
FIG. 7A is a schematic diagram illustrating an embodiment of an image display system with a first optical reflector in accordance with the present invention.

The disclosure in the first embodiment section is incorporated herein as long as it is consistent with the disclosure in the second embodiment. In the second embodiment, as shown in FIG. 7A, an image display system 200 comprises aa first image projector 210, a first optical reflector 220, and a first combiner 230. The image display system 200 can expand an eyebox for each of a viewer's eye. The first image projector 210 generates multiple light signals for a first image. By applying the principle of "time-split," the second embodiment uses the fast movement of the first optical reflector 220 to receive light signals of an image and then to quickly redirect the light signals towards the first combiner 230 at different angles of incidence caused by the moving of the first optical reflector 220. The first combiner 230 is positioned between the first optical reflector 220 and an eye of the viewer, and arranged to receive and converge the multiple light signals to a first view area of the viewer's eye to expand an eyebox 250 of the viewer's eye. And a moving frequency of the first optical reflector 220 is adjusted based on a projecting frequency of the first image projector 210 so that the multiple light signals of the first image are projected to the view area of the viewer's eye within the time period of persistence of vision.

The eyebox 250 is the view area from which a viewer's eye 240 can see a full image. In other words, as long as the viewer's eye moves within the eyebox, the viewer can see a full image. The eyebox (view area) may comprise a continuous area or multiple view points where one view point may be separated from, abutted on, or overlapped with the adjacent view point. The normal pupil size of adults varies from 2-4 mm in diameter in bright light, to 4-8 mm in the dark. In one embodiment, the distance between the center of two adjacent view points is about 2.6-3 mm People with ordinary skill in the art know how to determine the number of view points, the range of a view point, and the distance between the center of two adjacent view points considering the size of pupils, image resolution, the scanning speed of first image projector 210, and the interference effects among different instances of the light signals. When the first optical reflector 220 continuously moves, the eyebox may be a continuous view area which cannot be divided into multiple view points. As a result, when a viewer's eye moves from within the view area (eyebox), including from one view point to the next view point, the viewer's eye continues to see the whole image without interference.

The first optical reflector 220 may be a one dimensional MEMS mirror, a two dimensional MEMS mirror, a polygon cylinder reflector/mirror, a circular cylinder reflector/mirror, etc. The first optical reflector 220 may move in two modes. In the first mode, the optical reflector 220 moves between N positions, each of which corresponds to a view point within the first view area (eyebox), where N is an integer larger than 1. Depending on the size of the view point and the pupil's diameter, an eyebox can be designed to have multiple view points from each of which the viewer can see the whole image. In the second mode, the first optical reflector 220 moves continuously in a pattern so that the light signals are repeatedly redirected and converged by the first combiner 230 to a first view area of the viewer's eye.

Figure 7B:
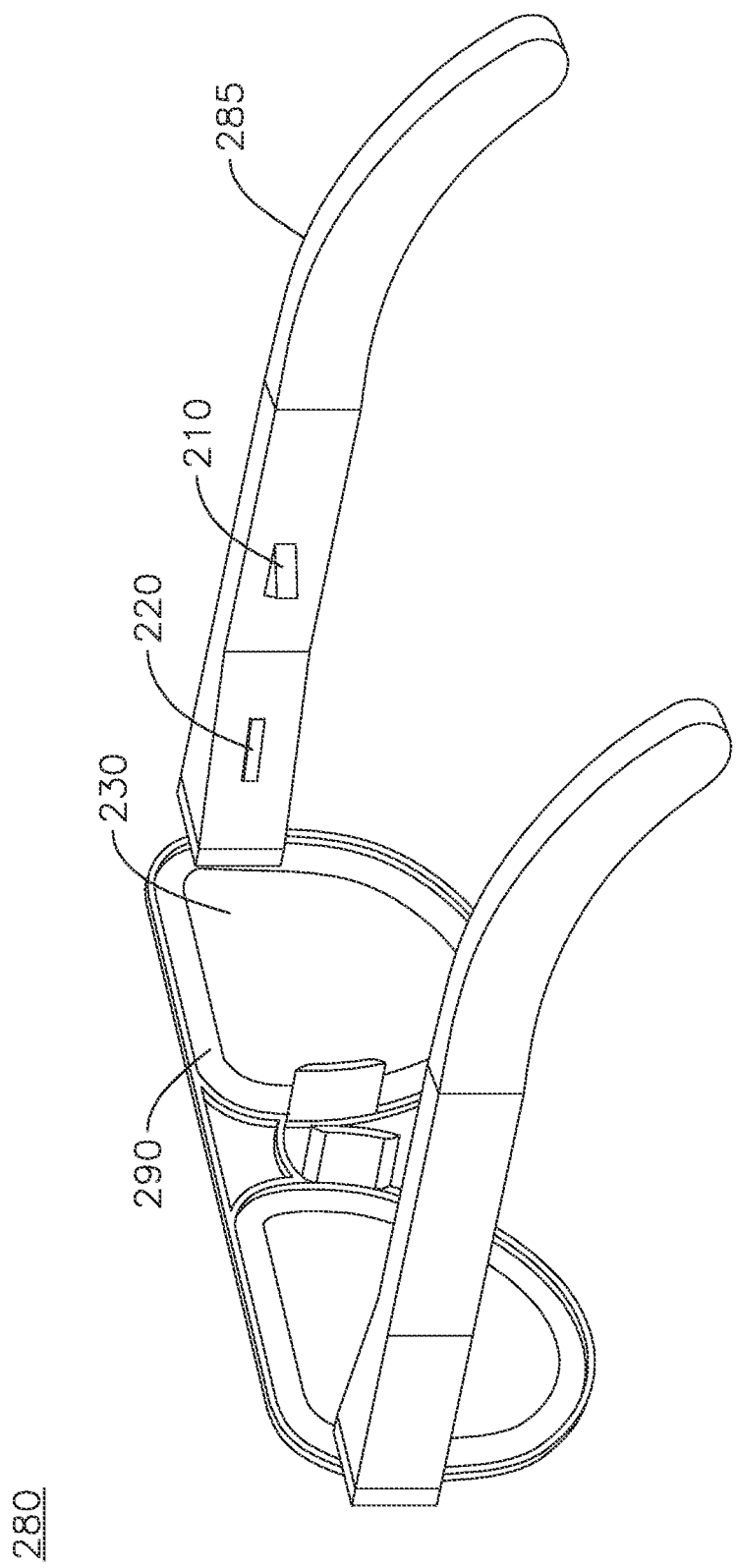
FIG. 7B is a schematic diagram illustrating an image display system carried by a pair of glasses in accordance with the present invention.

The image display system 200 may be carried by a head wearable device (HWD) which in one embodiment may be a pair of smart glasses 280 as shown in FIG. 7B. The pair of eyeglasses has a frame 285 and a pair of eyeglass lenses 290. The frame 285 carries the first image projector 210 and the first optical reflector 220. The location of the first image projector 210 and the first optical reflector 220 may be adjusted depending on the design of light paths. The eyeglass lens 290 carries the first combiner 230. In one embodiment, the first combiner 230 is integrated with the eyeglass lens 290 as one single component. In this situation, the image display system 200 may expand the eyebox for the wearer of the HWD. A viewer can see a full image from any location, including various view points (e.g. 251, 252, 253) in some circumstances, within the first view area (eyebox). In addition, since the smart glasses 280 can be customized for the viewer, the interpupillary distance (IPD) can be adjusted for each viewer. People with ordinary skill in the art know that the image display system 200 can be configured to expand eyebox simultaneously for multiple viewers in other embodiments.

The first image projector 210 may use laser, light emitting diode ("LED") including mini and micro LED, organic light emitting diode ("OLED"), or superluminescent diode ("SLD"), liquid crystal on silicon (LCoS), liquid crystal display ("LCD"), or any combination thereof as its light source. In one embodiment, the first image projector 210 is a laser beam scanning projector (LBS projector) which may comprise the light source including a red color light laser, a green color light laser, and a blue color light laser, a light color modifier, such as Dichroic combiner and polarizing combiner, and a 2D adjustable reflector, such as a 2D electromechanical system ("MEMS") mirror. The LBS projector sequentially generates and scans light signals one by one to form a 2D image at a predetermined resolution, for example 1280×720 pixels per frame. Thus, one light signal is generated and projected at a time towards the first optical reflector 220. For the viewer to see such a 2D image from one eye, the LPS projector has to sequentially generate light signals for each pixel, for example 1280×720 light signals, within the time period of persistence of vision, for example 1/18 second. Thus, the time duration of each light signal is about 60.28 nanosecond.

In another embodiment, the first image projector 210 may be a digital light processing projector ("DLP projector") which can generate a 2D color image at one time. Texas Instrument's DLP technology is one of several technologies that can be used to manufacture the DLP projector. The whole 2D color image per frame, which for example may comprise 1280×720 pixels, is simultaneously projected towards the first optical reflector 220. Thus, the first optical reflector 220 is able to simultaneously redirect the multiple light signals of a frame, for example 1280×720 light signals, towards the first combiner 230.

The first optical reflector 220, positioned and oriented in an optical path between the first image projector 210 and the first combiner 230, is arranged to simultaneously receive one or more light signals generated by the first image projector 110, and to reflect the one or more light signals towards the first combiner 230. The first combiner 230, positioned and oriented between the first optical reflector 220 and a viewer's eye 240, is to redirect one or more light signals from the first optical reflector 220 and converge multiple light signals to the first view area of the viewer's eye to expand the eyebox of a viewer's eye.

Figure 10:
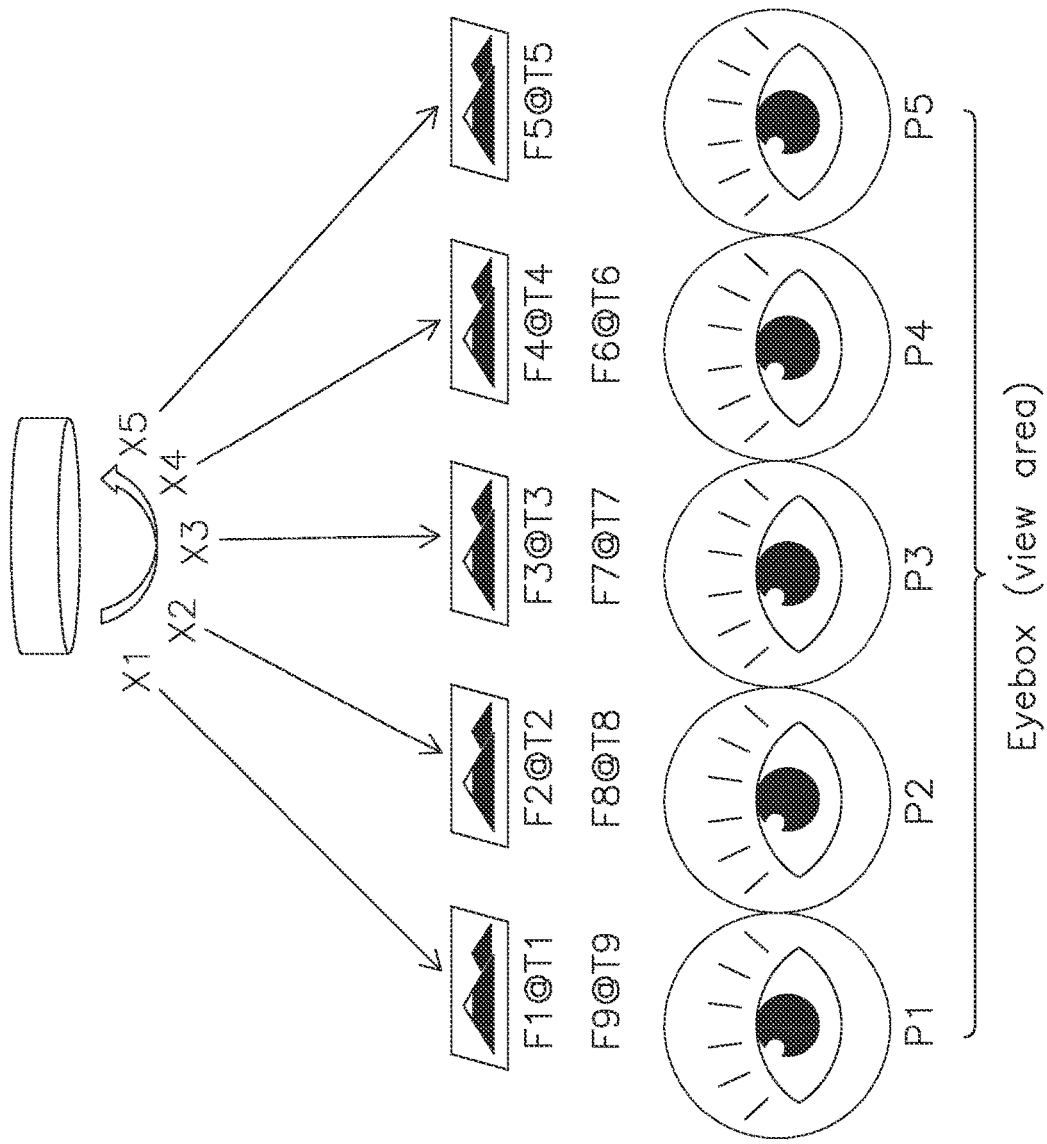
FIG. 10 is a schematic diagram illustrating multiple view points in a view area generated by an embodiment of an image display system in accordance with the present invention.

In the first mode, the first optical reflector 220 moves between multiple positions N to reflect light signals towards different portion of the first combiner 230, where N is an integer greater than 1. For example, as shown in FIG. 10, when N=5, the first optical reflector 220 moves very fast between 5 positions (X1, X2, X3, X4, X5). In one embodiment, the first optical reflector 220 is a one dimensional (1D) MEMS mirror, which repeatedly moves from X1 to X5 and then back to X1 in a pattern of X1→X2→X3→X4→X5→X4→X3→X2→X1. When the first optical reflector 220 is at X1 position, the light signals are reflected to the first combiner 230 and then converged to the view point P1. In details, the one dimensional MEMS mirror holds still at X1 position when the LBS projector scans the first full image frame (F1). Then the mirror moves to the X2 position. Similarly, when the first optical reflector 220 is at X2 position, the light signals are reflected to the first combiner 230 and then converged to the view point P2. In details, the one dimensional MEMS mirror holds still at X2 position when the LBS projector scans the second full image frame (F2). Then the 1D MEMS mirror moves to the X3 position where the third full image frame (F3) is scanned, reflected and converged to the view point P3. The first optical reflector 220 moves to the X4 position where the fourth full image frame (F4) is scanned, reflected and converged to the view point P4. The first optical reflector 220 moves to the X5 position where the fifth full image frame (F5) is scanned, reflected and converged to the view point P5. The first optical reflector 220 moves to the X4 position where the sixth full image frame (F6) is scanned, reflected and converged to the view point P4. The first optical reflector 220 moves to the X3 position where the seventh full image frame (F7) is scanned, reflected and converged to the view point P3. The first optical reflector 220 moves to the X2 position where the eighth full image frame (F8) is scanned, reflected and converged to the view point P2. When the first optical reflector 220, such as the 1D MEMS mirror, moves back to X1 position, the second cycle begins. For a motion picture to be smoothly watched, a viewer has to be able to see at least one complete image frame within the time period of persistence of vision, for example 1/18 second.

When the first image projector 210 is an LBS projector, the light signal of each pixel is received and reflected one by one at a corresponding location on the first optical reflector 220. In one embodiment, the light signal of each pixel of a first image frame (e.g. 1280×720 pixels) may be sequentially reflected by the first optical reflector 220 at position X1. Similarly, the light signal of each pixel of a second image frame may be sequentially reflected by the first optical reflector 220 at position X2. In this situation, the first optical reflector 220 needs to stay at the same position for at least a period of time so that the LBS projector can scan the whole image frame.

Figure 8:
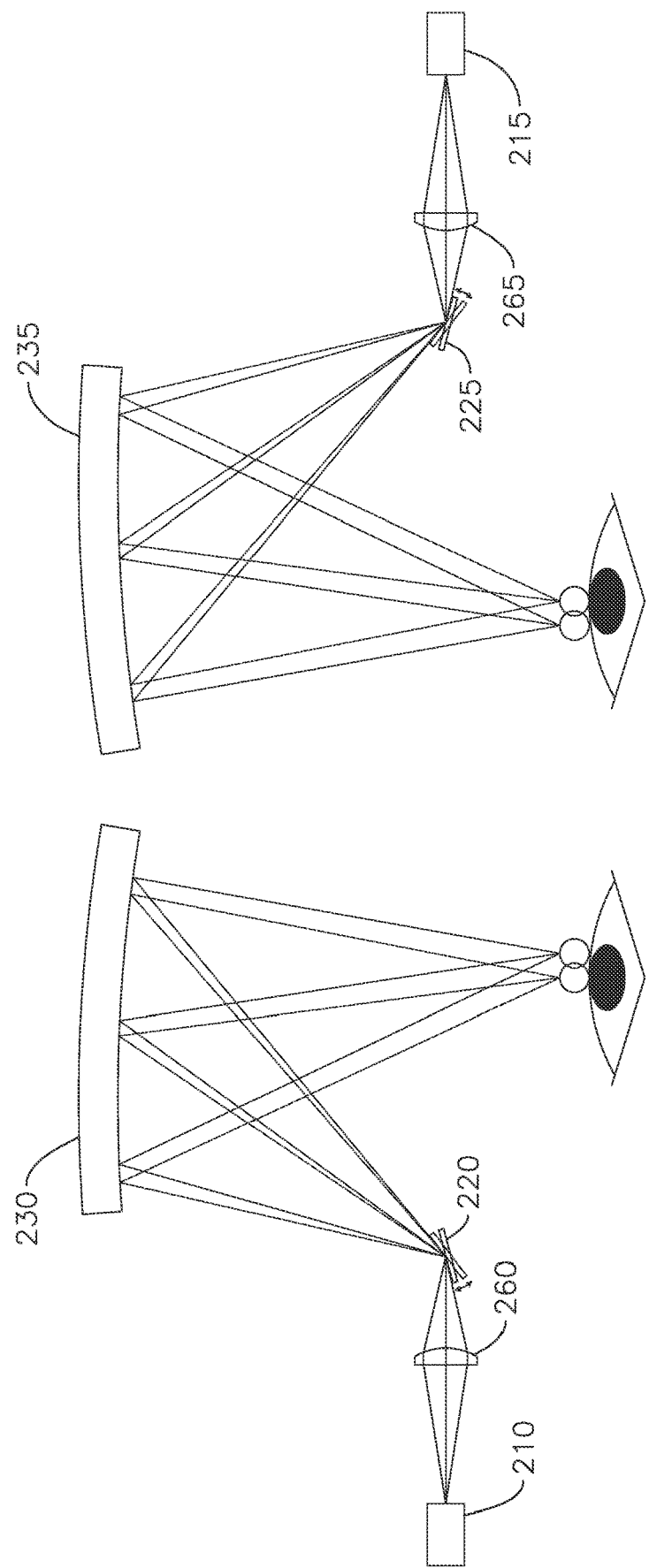
FIG. 8 is a schematic diagram illustrating an embodiment of an image display system where a first image projector is a DLP projector in accordance with the present invention.

As shown in FIG. 8, when the first image projector 210 is a DLP projector, the light signals of all pixels are received and reflected simultaneously at corresponding locations on the first optical reflector 220. The light signals of all pixels of a first image frame (e.g. 1280×720 pixels) may be simultaneously reflected by the first optical reflector 220 at position X1, and then redirected and converged to the view point P1 by the first combiner 230. The same applies to other positions and view points.

In the second mode, the first optical reflector 220 moves continuously to reflect light signals towards different location of the first combiner 230. In one embodiment, the optical reflector 220 is a one dimensional MEMS mirror, which continuously moves back and forth between two end positions, e.g. X1→X5→X1. When the first image projector 210 is an LBS projector, the light signal of each pixel is received and reflected one by one while the first optical reflector 220 continuously moves.

Figure 9A:
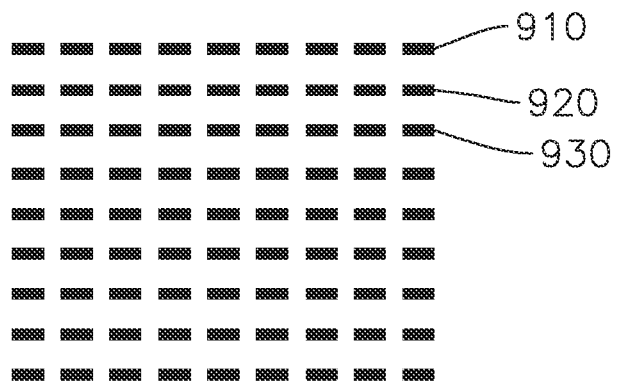
FIGS. 9A-D are schematic diagrams illustrating image pixels displayed by an embodiment of an image display system with a continuously moving optical reflector in accordance with the present invention.
Figure 9B:
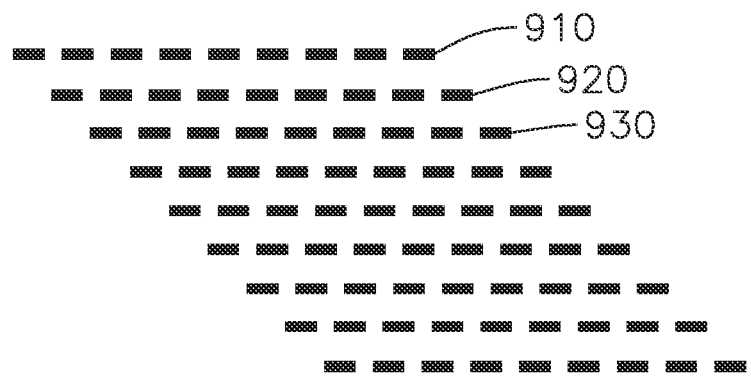

FIGS. 9A-9D further illustrate the process of image formation in the second mode. As described above, throughout the course of image formation of an image frame, the first optical reflector 220, such as a one-dimensional MEMS mirror, continuously moves (rotates back and forth in one dimension) and changes positions while the first image projector 210, such as an LBS projector, scans in a row-by-row or column-by-column manner to form the image frame. With reference to FIG. 9A, without the movement of the one-dimensional MEMS mirror, the image frame produced by the LBS projector may be rectangular-shaped. For example, line 910 represents the first row of image pixels; line 920 represents the second row of image pixels; and line 930 represents the third row of image pixels. However, in the second mode, the image frame may be distorted into a parallelogram shape due to the motion of the one-dimensional MEMS mirror. The reason is that the LBS projector produces an image frame by projecting one image pixel at a time; the LBS projector then alters the location and/or angle of projection to scan another image pixel at a new location. The new location is oftentimes horizontally or vertically right next to the previous image pixel. Therefore, after a period of time, the LBS projector produces a row of image pixels or a column of image pixels (e.g., 1280×1 or 1×720). The LBS projector then changes the location and/or angle of projection to the next row (row-by-row scanning) or next column (column-by-column scanning) and continues to produce a second row or a second column of image pixels. This process is repeated until a complete image frame is produced (e.g., completing 1280×720 image pixels). However, in the second mode of the present invention, not only the LBS projector changes the location and/or angle of projection, the movement of the MEMS mirror also affects the final shape of the image frame. More specifically, the starting location of projection for each row of image pixel or each column of image pixels of an image frame is shifted due to the movement/rotation of the one-dimensional MEMS mirror. As a result, the shape of the image frame, as shown in FIG. 9B, may resemble a parallelogram due to the change of the angel of incidence of the light signals towards the one-dimensional MEMS mirror caused by the moving of the mirror.

Figure 9C:
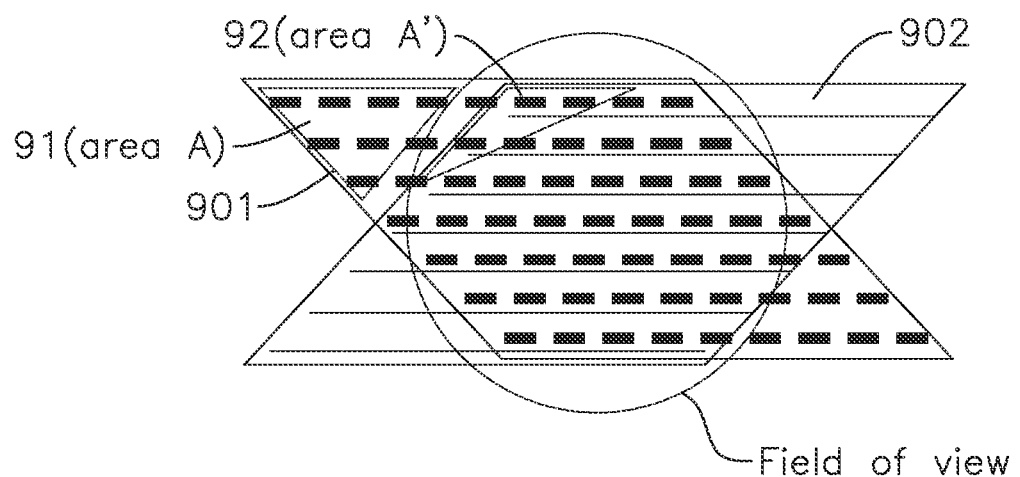

With reference to FIG. 9C, in some embodiments, the time (TEP, time between end points, ½f) needed for the one-dimensional MEMS mirror to move from an end point to another (e.g., X1→X5, half of a period) may be set to be the same as the time (TF, time of a frame) required for the LBS projector to complete scanning of an image frame. In other words, the moving frequency of the first optical reflector, such as one-dimensional MEMS mirror, has to be adjusted based on the projecting frequency of the first image projector, such as the LBS projector, so that the multiple light signals of the first image are projected to the view area of the viewer's eye within the time period of persistence of vision. During the time period which the one-dimensional MEMS mirror moves from X5 back to X1, the LBS projector completes a second image frame 902. In one embodiment of the present invention, the first image frame 901 and the second image frame 902 may contain approximately identical image information (pixels). In other words, the contents of the first image frame 901 and the second image frame are substantially the same. The amount of difference in contents between the first image frame 901 and the second image frame 902 depends on the frame rate of the LBS projector. The higher the frame rate is, the smaller the difference in contents between the first image frame 901 and the second image frame 902 is (and vice versa). In another embodiment, the first image frame 901 and the second image frame 902 may contain slightly different image information due to a lower frame rate.

Furthermore, with reference to FIG. 9C, in some embodiments, a portion of the image frame may exceed the boundary of the field of view of a viewer's eye and creates a blind spot 91 in the field of view, such as area A of the first image frame 901 shown in FIG. 9C. However, since the first image frame 901 and the second image frame 902 may contain approximately identical image information, the portion of image information (pixels) contained in area A may be seen in the spot 92 shown as area A' of the second image frame 902. Thereby, the viewer is still able to see the complete image frame. Thus, for a viewer to see a complete image frame, the first image frame 901 and the second image frame 902 have to be completely projected within the time period of the persistence of vision. Furthermore, the second image frame 902 is a refreshment of the first image frame 901 where the image refresh rate is equal to 1/TF. However, depending on the frame rate, in other embodiments, the first and second image frames 901 and 902 may contain different image information.

Figure 9D:
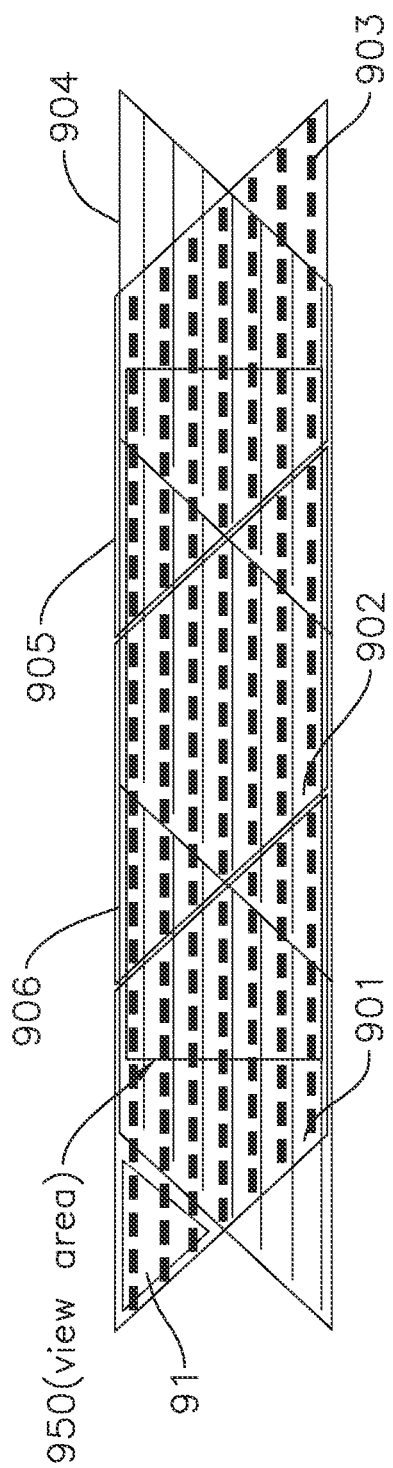

With reference to FIG. 9D, in other embodiments of the second mode, the time (TEP) needed for the one-dimensional MEMS mirror to move from an end point to another (e.g. X1→X5) may be set to be multiples of the time required for the LBS to scan a complete image frame, so N×TF=TEP, where N is a positive integer and TF is the time required for the LBS projector to scan an image frame. In this embodiment, multiple (N) image frames may be generated during the time period for the one-dimensional MEMS mirror to move from one end point to another (e.g., X1→X5). As a result, the eyebox is expanded to a continuous view area 950 due to continuous moving of the first optical reflector 220 to change the angles of incidence and thus the location of convergence of light signals redirected from the first combiner 230, rather than one view point. FIG. 9D illustrates an exemplary embodiment in which the first, second and third image frames are formed consecutively when the one-dimensional MEMS mirror moves from X1→X5; the fourth, fifth, and sixth image frames are formed consecutively when the one-dimensional MEMS mirror moves from X5→X1. In some embodiments, all six image frames may contain approximately identical image information (pixels) because of a high frame rate. To see these six image frames smoothly, the first to the sixth image frames have to be completely scanned within the time period of the persistence of vision. However, in other embodiments, the six image frames do not need to contain identical image information. For example, the first, second, and third image frames may contain approximately identical image information, and the fourth, fifth, and six image frames may contain approximately identical image information. As described above, some image frames may contain a blind spot 91. However, since the rest of the image frames may comprise the same image information, the image information (pixels) in the blind spot 91 can be complemented by a portion of other image frames so the viewer can still see the full image frames.

At the end, for a viewer to see a full image, he or she needs to see all different portions of a full image frame within the time period of persistence of vision, for example ⅛ second. A full image frame can be auto-stitched from different portions seen by a viewer's eye located within a first view area. Nevertheless, these different portions may come from different image frames. Since the contents of these different frames are close to each other due to a high frame rate, it is hard for a viewer to find out that different portions come from different image frames. Further, for a viewer to watch a motion picture smoothly, he or she has to be able to see at least one complete image frame at the same location in the first view area within the time period of persistence of vision, for example ⅛ second. In addition, in order for a viewer to see good quality images, reducing interference and providing phase shift compensation may be needed. One solution for interference reduction is to synchronize the frequency of the LBS projector and the round-trip frequency of the one dimensional MEMS mirror (X1→X5→X1). For example, if the image projector 210 starts generating a first light signal of an image frame at the same time the optical reflector 220 starts to move from the beginning position X1 so that the first light signal would be seen at the first view point P1, such better synchronization improves the image quality.

When the first image projector 210 is a DLP projector, the light signals of all pixels are received and reflected simultaneously at corresponding locations on the first optical reflector 220. Thus, at any specific moment the first optical reflector 220 continues to move, the light signals of all pixels of an image frame (e.g. 1280×720 pixels) may be simultaneously reflected by the first optical reflector 220, and then redirected and converged to the view area of the viewer's eye by the first combiner 230. When the first optical reflector 220 is a one dimensional MEMS mirror and continuously moves back and forth between two end positions, e.g. X1 and X5, the light signals of the image frame are converged to the first view area.

Figure 11A:
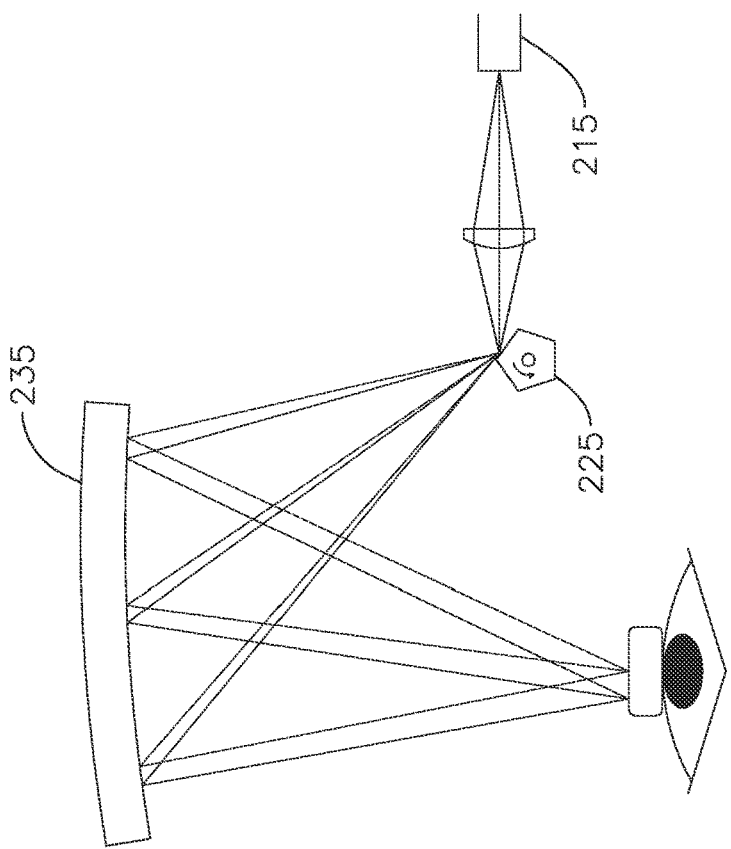
FIG. 11A is a schematic diagram illustrating an embodiment of an image display system with a pentagon cylinder reflector in accordance with the present invention.
Figure 11A:
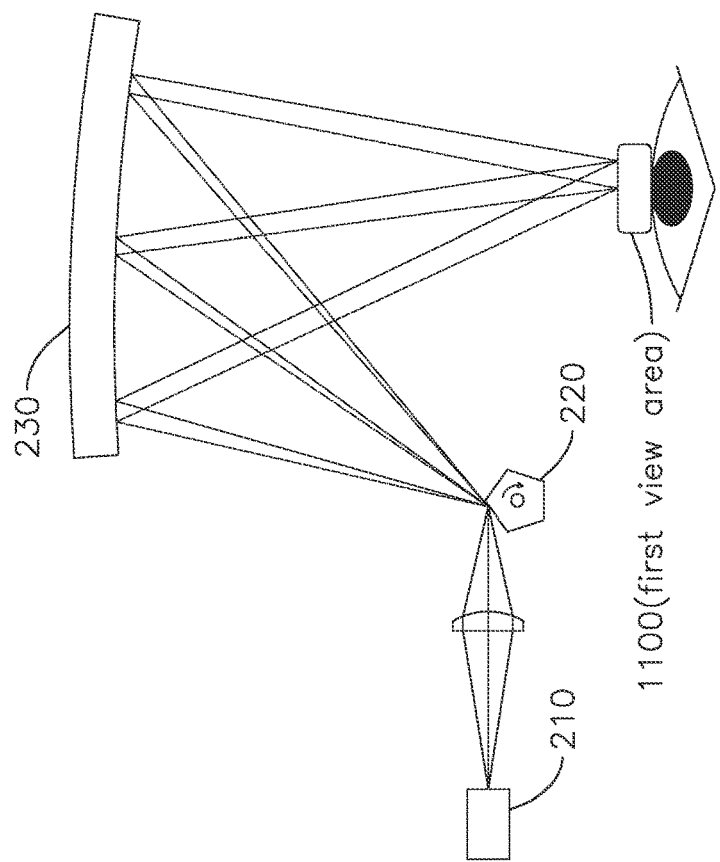
Figure 11B:
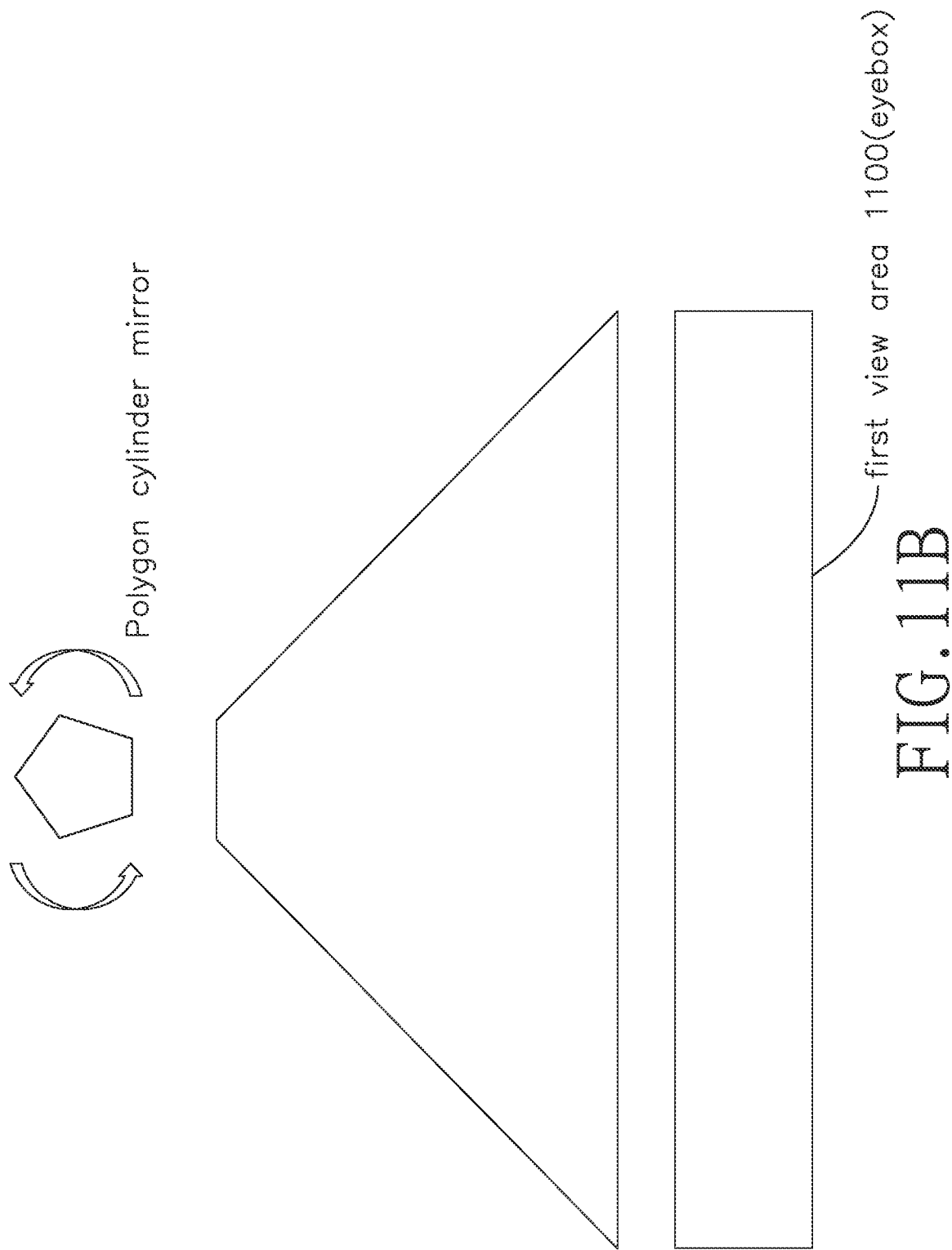
FIG. 11B is a schematic diagram illustrating a first view area generated by an embodiment of an image display system with a pentagon cylinder reflector in accordance with the present invention.

In another embodiment of the second mode, the first optical reflector 220 is a polygon cylinder reflector, which continuously rotates clockwise or counter-clockwise, to reflect light signals to the first combiner 230, which redirects and converges the light signals to the first view area 1100 of a viewer's eye to expand the eyebox of the viewer's eye. As shown in FIGS. 11A & 11B, the first view area 1100 is a continuous area due to the continuous movement of the polygon cylinder reflector. However, for the convenience of explanation only, the continuous first view area is conceptually divided into 5 view points. When the first image projector 210 is an LBS projector and the first optical reflector 220 is a pentagon cylinder reflector, the light signal of each pixel is received and reflected one by one while the first optical reflector 220 continuously moves. The pentagon cylinder reflector has 5 sides. Thus, during a first period of time the first optical reflector 220 continues to move from the beginning point X10 of the first side of the pentagon cylinder reflector towards the end point X15 of the same first side, the light signals of a first portion (e.g. first ⅕) of the first image frame are reflected and redirected into the space range of the first view point P1. During the second period of time the first optical reflector 220 continues to move towards the end point of the first side X15, the light signals of a second portion (e.g. second ⅕) of the first image frame are reflected and redirected into the space range of the second view point P2. Similarly, during the fifth period of time the first optical reflector 220 continues to move towards the end point of the first side X15, the light signals of a fifth portion (e.g. fifth ⅕) of the first image frame are reflected and redirected into the space range of the fifth view point P5. Actually, since the first optical reflector, such as the pentagon cylinder reflector, rotates continuously, the first image is continuously projected and converged into the first view area 1100. The conceptually divided 5 view points are overlapped to a certain extent to form the first view area 1100. Then the pentagon cylinder reflector continues to rotate to the beginning point X20 of the second side of the pentagon cylinder reflector. In the meantime, the light signals of the second image frame have scanned to the beginning of the second portion (e.g. second ⅕). That means during the sixth period of time the first optical reflector 220 continues to move from the beginning point X20 of the second side towards the end point X25 of the same second side, the light signals of a second portion (e.g. second ⅕) of the second image frame are reflected and redirected into the space range of the first view point P1. Similarly, during the seventh period of time the first optical reflector 220 continues to move towards the end point of the second side X25, the light signals of a third portion (e.g. third ⅕) of the second image frame are reflected and redirected into the space range of view point P2. At the end, for a viewer to see a full image, he or she needs to see all different portions of a full image frame (e.g. first ⅕, second ⅕, third ⅕, fourth ⅕, and fifth ⅕) within the time period of persistence of vision, for example 1/18 second. Nevertheless, these different portions may come from different image frames. Since these different frames are close to each other on the time line and the image pixels on two adjacent image frames are substantially the same, it is hard for a viewer to find out that different portions come from different image frames. A full image frame can be auto-stitched from different portions of different image frames seen by a viewer's eye located within a first view area 1100 within the time period of persistence of vision. Further, for a viewer to watch a motion picture smoothly, he or she has to be able to see multiple complete image frames within a first view area 1100 within the time period of persistence of vision, for example 1/18 second.

As discussed before, in the situation of using an LBS projector for the first image projector 210 in the second mode, in order for a viewer to see good quality images, reducing interference and providing phase shift compensation may be needed. One solution for interference reduction here is to synchronize the frequency of the LBS projector, the number of sides and the rotational frequency of the polygon cylinder reflector. For example, if the first optical reflector 220 starts to move from the beginning position X1 of each side of the polygon cylinder reflector, at the same time the first image projector 210 starts generating an appropriate portion of light signal of an image frame, so that the full image frame would be seen at each point with the first view area as described in the prior paragraph, such better synchronization improves the image quality. For example, during a period of time the first optical reflector 220 continuously moves from the beginning point X10 of the first side of the pentagon cylinder reflector towards the end point X15 of the same first side, the first image projector 210 projects one or more complete image frames.

As shown in FIG. 11A, when the first image projector 210 is a DLP projector and the first optical reflector 220 is a pentagon cylinder reflector, the light signals of all pixels are received and reflected simultaneously at corresponding locations on the first optical reflector 220. As described above, the first view area 1100 in FIG. 11B is a continuous area due to the continuous movement of the pentagon cylinder reflector. However, for the convenience of explanation only, the continuous first view area 1100 is conceptually divided into 5 view points. The pentagon cylinder reflector has 5 sides. When the beginning point X10 of the first side of the pentagon cylinder reflector receives the light signals of all pixels from the first image projector 210, these light signals are redirected and converged by the first combiner 230 to the beginning of the space range of the first view point P1. When the pentagon cylinder reflector continues to move towards the end point X15 of the first side of the pentagon cylinder reflector, the light signals of the pixels redirected and converged by the first combiner 230 also move towards the end of the space range of the last view point P5. Then the pentagon cylinder reflector continues to rotate and the beginning point X20 of the second side of the pentagon cylinder reflector receives the light signals of all pixels from the first image projector 210, these light signals are redirected and converged by the first combiner 230 back to the beginning of the space range of the first view point P1. When the pentagon cylinder reflector continues to move towards the end point X25 of the second side of the pentagon cylinder reflector, the light signals of the pixels redirected and converged by the first combiner 230 also move towards the end of the space range of the last view point P5. When the pentagon cylinder reflector continues to rotate to the third side, fourth side, and the fifth side, the same process repeats. Depending on the frame rate of the first image projector 210 and the rotational speed, the viewer may see one or more image frames during the period of time the same side of a polygon cylinder reflector receives light signals. Actually, since the first optical reflector 220, such as the pentagon cylinder reflector, rotates continuously, a full image frame is continuously projected and converged into the first view area 1100. The conceptually divided 5 view points are overlapped to a certain extent to form the first view area 1100. Again, at the end, for a viewer to see a full image, he or she needs to see all different portions of a full image frame within the time period of persistence of vision, for example 1/18 second. Nevertheless, these different portions may come from different image frames. Since these different frames are close to each other on the time line and the image pixels on two adjacent image frames are substantially the same, it is hard for a viewer to find out that different portions come from different image frames. A full image frame can be auto-stitched from different portions of different image frames seen by a viewer's eye located within a first view area 1100 within the time period of persistence of vision. Further, for a viewer to watch a motion picture smoothly, he or she has to be able to see multiple complete image frames at the same view point within the time period of persistence of vision, for example 1/18 second.

People with ordinary skill in the art would know that multiple image display systems may be implemented concurrently to expand the eyebox for multiple viewers, in particular when a polygon cylinder reflector is used as the optical reflector 220.

The first combiner 230 may be made of glasses or plastic materials like lens, coated with certain materials such as metals to make it partially transparent and partially reflective. The first combiner 230 may be a holographic combiner but not preferred because the diffraction effects can cause multiple shadows and RGB displacement. In some embodiments, we may want to avoid using holographic combiner.

As shown in FIGS. 8 and 11A, the image display system 200 may further comprise a first collimator 260 positioned between the first image projector 210 and the first optical reflector 220 to cause the motion directions of the light signals to become more aligned (parallel) in a specific direction. In other words, the light signal of different pixels from the first image projector 210 may become approximately parallel to each other after passing through the first collimator 260. Thus, the first collimator 260 causes the angle of incidence of each light signal to the first optical reflector 220 to be approximately the same. The first collimator 260 can be a curved lens or convex lens.

As described above, the image display system 200 with the first image projector 210, the first optical reflector 220, and the first combiner 230 may expand an eyebox for a viewer's eye. In one embodiment, the image display system 200 may further include a second image projector 215, a second optical reflector 225, and a second combiner 235, which collectively function in substantially the same manner as the first image projector 210, the first optical reflector 220, and the first combiner 230, to expand an eyebox for the other eye of the viewer. Similarly, the second image projector generates multiple light signals for a second image. The second optical reflector is arranged to receive the multiple light signal generated by the second image projector, and redirect the multiple light signals towards a second combiner at a different angle of incidence caused by moving of the second optical reflector. The second combiner positioned between the second optical reflector and the other eye of the viewer, and arranged to receive and converge the multiple light signals to a second view area of the other eye of the viewer to expand an eyebox of the other eye of the viewer. In addition, a moving frequency of the second optical reflector is adjusted based on a projecting frequency of the second image projector so that the multiple light signals of the second image are projected to a second view area of the other eye of the viewer within the time period of persistence of vision.

In addition, the second image projector may have a structure similar to the first image projector. The second optical reflector may have a structure similar to the first optical reflector. The second combiner may have a structure similar to the first combiner. Thus, the image display systems 100 may expand the eyebox for both right eye and left eye of the viewer.

The image display system 200 may include a support structure wearable on a head of the viewer to carry the first image projector 210, the second image projector 215, the first optical reflector 220, the second optical reflector 225, the first combiner 230, and second combiner 235. The first combiner 230 and the second combiner 235 are positioned within a field of view of the viewer. Thus, in this embodiment, the image display system 200 is a head wearable device (HWD). In particular, as shown in FIG. 7B, the image display system is carried by a pair of glasses, which is referred to as smart glasses. In this situation, the support structure may be a frame of a pair of glasses with or without lenses. The lenses may be prescription lenses used to correct nearsightedness, farsightedness, etc. The first image projector 210 and the first optical reflector 220 are carried by a right temple of the frame. The second image projector 215 and the second optical reflector 225 are carried by a left temple of the frame. The first combiner 230 may be carried by the right lens and the second combiner 235 may be carried by the left lens. The carrying can be implemented in various manner. The combiner may be attached or incorporated to the lens by either a removable or a non-removable means. The combiner may be integratedly made with the lens, including prescription lens. When the support structure does not include lenses, the right combiner and the left combiner may be directly carried by the frame or rims.

Similar to the first embodiment, the image display system 200 for both eyes of a viewer may be arranged to display an object with depths. Because the depth of the object is the same as the location both eyes of the viewer fixate, vergence-accommodation conflict (VAC) and focal rivalry can be avoided. In this embodiment, a light signal converged from the second combiner 230 is a first redirected right light signal, a corresponding light signal converged from the first combiner is a first redirected left light signal, and the first redirected right light signal and the first redirected left light signal are perceived by the viewer to display a first virtual binocular pixel of an object with a first depth that is related to a first angle between the first redirected right light signal and the corresponding first redirected left light signal. In general, the first depth is determined by the relative horizontal distance between the first redirected right light signal and the corresponding first redirected left light signal.

Figure 12:
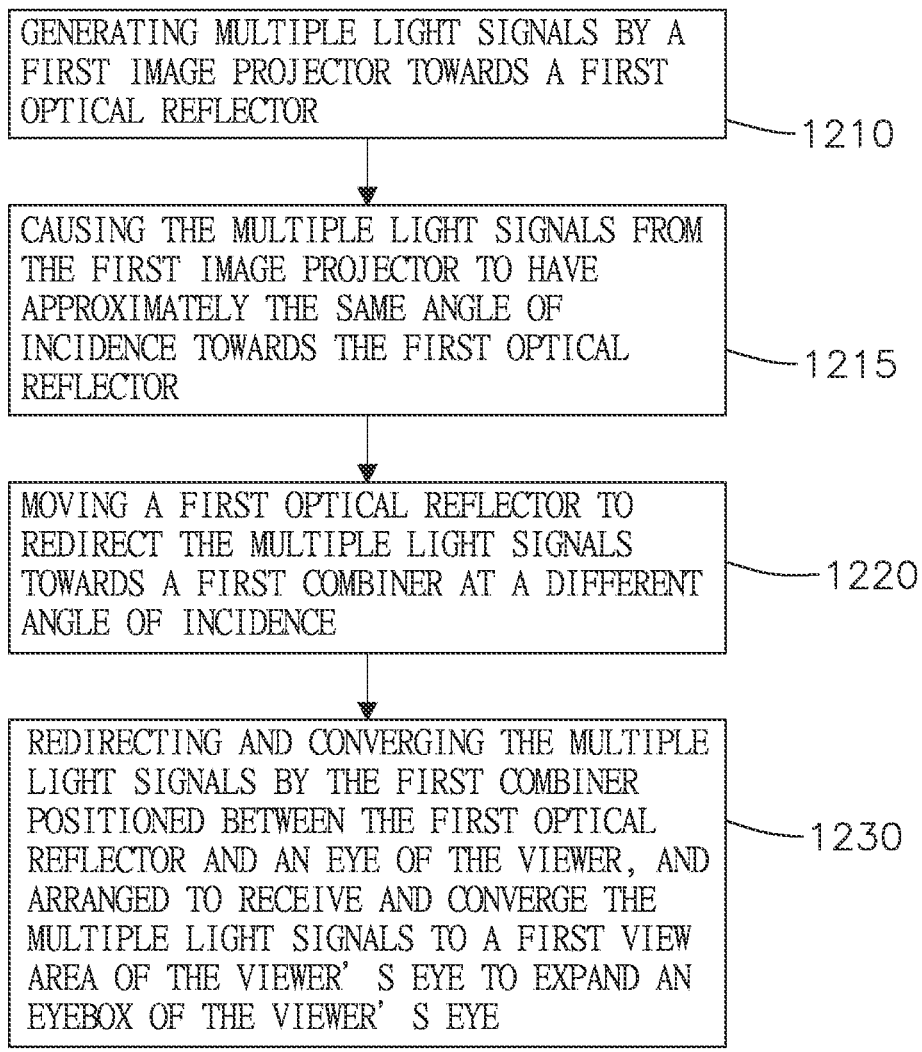
FIG. 12 is a flow chart illustrating an embodiment of processes for expanding an eyebox for a viewer's eye by an image display system with a first optical reflector in accordance with the present invention.

FIG. 12 illustrates a method of expanding an eyebox of a viewer for the second embodiment applying time split principle. At step 1210, the first projector 210 generates multiple light signals towards a first optical reflector 220. In one embodiment, the first image projector 210 may be a laser beam scanning projector (LBS projector) which sequentially generates a light signal of an image pixel one by one. In another embodiment, the first image projector 220 may be a DLP projector that simultaneously generates light signals of an image (for example a frame of 1280×720 pixels). In either embodiment, when the first image projector 120 generates the light signals at high speed (e.g. 60 frames/second), the viewer can see a video smoothly due to persistence of vision.

At step 1220, the first optical reflector 220 receives the light signal and redirect the light signals to different portion of the first combiner 230 while the first optical reflector 220 moves. The first optical reflector 220 may be a one dimensional MEMS mirror, a two dimensional MEMS mirror, a polygon cylinder reflector/mirror, a circular cylinder reflector/mirror, etc. The first optical reflector 220 may move in two modes. In the first mode, the first optical reflector 220 moves between N positions, each of which corresponds to a view point, where N is an integer larger than 1. In the second mode, the first optical reflector 220 moves continuously in a pattern so that the light signals are repeatedly redirected and converged by the first combiner 230 to a first view area of the viewer's eye to expand an eyebox of the viewer's eye.

At step 1230, the first combiner 230 reflects and converges the multiple light signals to a first view area of the viewer's eye to expand an eyebox of the viewer's eye while the first optical reflector 220 moves. The first combiner 230 is positioned between the first optical reflector 220 and an eye of the viewer.

Furthermore, a moving frequency of the first optical reflector is adjusted based on a projecting frequency of the first image projector so that the multiple light signals of the first image are projected to the first view area of the viewer's eye within the time period of persistence of vision.

In addition to the above three steps, in one embodiment, after step 1210 and before step 1220, the method further comprises step 1215 to cause the light signal of multiple image pixels to have approximately the same angle of incidence towards the first optical reflector 220. A first collimator may be positioned at the light path between the first image projector 210 and the first optical reflector 220 to perform this function.

In sum, one feature is that almost the whole area of the combiner 230 can be used for the field of view (FOV). The light signals of a full image are redirected by the first optical reflector 220 to almost the whole area of the combiner 230 which converges the light signals to the first view area of a viewer's eye. When the first optical reflector 220 moves, the light signals of a full image are redirected to slightly different portion of the first combiner 230. Thus, certain amount of area of the combiner 230 needs to be reserved in consideration of the movement of the first optical reflector 220. Other than that reserved amount of area, the remaining area of the first combiner 230 can be used for the field of view (FOV).

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. An image display system for eyebox expansion, comprising:
   a first image projector generating multiple light signals for a first image;
   a first optical duplicator comprising at least one optical element arranged to receive a first light signal corresponding to a pixel of the first image and generated by the first image projector, duplicate the first light signal into N nonparallel instances, and redirect respective ones of N instances of the light signal towards a first combiner, wherein N is an integer greater than 1;
   a second image projector generating multiple light signals for a second image;
   a second optical duplicator comprising at least one optical element arranged to receive a second light signal corresponding to a pixel of the second image and generated by the second image projector, duplicate the second light signal into M nonparallel instances, and redirect respective ones of M instances of the light signal towards a second combiner, wherein M is an integer greater than 1;
   wherein, the first combiner positioned between the first optical duplicator and an eye of the viewer, and arranged to receive and converge each one of the N nonparallel instances of the light signal respectively to N view points within an eyebox of the viewer's eye, the second combiner positioned between the second optical duplicator and the other eye of the viewer, and arranged to receive and redirect each one of the M nonparallel instances of the light signal respectively to M view points within an eyebox of the viewer's other eye,
   wherein a light signal redirected from the second combiner is a first redirected right light signal, a corresponding light signal redirected from the first combiner is a first redirected left light signal, and the first redirected right light signal and the first redirected left light signal are perceived by the viewer to display a first virtual binocular pixel of an object with a first depth where both eyes of the viewer fixate,
   wherein extension of light paths of the N nonparallel instances of the first light signal of the first image redirected from the first combiner and extension of light paths of the M nonparallel instances of the second light signal of the second image redirected from the second combiner virtually converge on a same converging point.

2. The image display system of claim 1, wherein the N nonparallel instances of the light signal from the first optical duplicator physically converges on the first combiner or the light path extension of the N nonparallel instances of the light signal redirected from the first combiner virtually converge on a converging plane behind the first combiner further away from the viewer's eye.

3. The image display system of claim 1, wherein the first optical duplicator comprises one or more of beam splitters, polarizing splitters, half-silvered mirrors, partial reflective mirrors, dichroic mirrored prisms, dichroic optical coatings and dielectric optical coatings, or a combination thereof.

4. The image display system of claim 1, wherein N equals to 3 and the optical duplicator is a beam splitter comprising two partial reflectors and one complete reflector to split the light signal into three instances.

5. The image display system of claim 1, wherein the first image projector is a laser beam scanning (LBS) projector or a digital light processing (DLP) projector.

6. The image display system of claim 1, wherein the first combiner is not a holographic combiner.

7. The image display system of claim 1, further comprising a first collimator positioned between the first image projector and the first optical duplicator to cause the motion directions of the light signals to become more aligned in a specific direction.

8. The image display system for eyebox expansion, comprising:
   a first image projector generating multiple light signals for a first image;
   a second image projector generating multiple light signals for a second image;
   a first optical reflector comprising at least one optical element arranged to receive a first light signal of the multiple light signals corresponding to a pixel of the first image and generated by the first image projector, and redirect the first light signal of the multiple light signals towards a first combiner at a different angle of incidence caused by moving of the first optical reflector;
   a second optical reflector comprising at least one optical element arranged to receive a second light signal of the multiple light signal corresponding to a pixel of the second image and generated by the second image projector, and redirect the second light signal of the multiple light signals towards a second combiner at a different angle of incidence caused by moving of the second optical reflector;

the first combiner positioned between the first optical reflector and an eye of the viewer, and arranged to receive and converge the multiple light signals to a first view area of the viewer's eye to expand an eyebox of the viewer's eye;

the second combiner positioned between the second optical reflector and the other eye of the viewer, and arranged to receive and converge the multiple light signals to a second view area of the other eye of the viewer to expand an eyebox of the other eye of the viewer; and wherein a moving frequency of the first optical reflector is adjusted based on a projecting frequency of the first image projector so that the multiple light signals of the first image are projected to the view area of the viewer's eye within the time period of persistence of vision, a moving frequency of the second optical reflector is adjusted based on a projecting frequency of the second image projector so that the multiple light signals of the second image are projected to a second view area of the other eye of the viewer within the time period of persistence of vision, wherein a light signal converged from the second combiner is a first redirected right light signal, a corresponding light signal converged from the first combiner is a first redirected left light signal, and the first redirected right light signal and the first redirected left light signal are perceived by the viewer to display a first virtual binocular pixel of an object with a first depth where both eyes of the viewer fixate, wherein the first optical reflector moves back and forth between N positions to cause the first light signal of the multiple light signals to be projected to N view points within the first view area of the viewer's eye through the first combiner to create N instances of the first light signal, and N is an integer greater than 1, the first light signal is projected to a specific view point when the first optical reflector is at a corresponding position, wherein the second optical reflector moves back and forth between M positions to cause the second light signal of the multiple light signals corresponding to the first light signal to be projected respectively to M view points within the second view area of the viewer's eye through the second combiner to create M instances of the second light signal, and M is an integer greater than 1, the another one of the multiple light signals is projected to a specific view point when the second optical reflector is at a corresponding position, wherein light path extension of the N instances of the first light signal of the first image redirected from the first combiner and the M instances of the second light signal of the second image redirected from the second combiner virtually converge on a same converging point.

9. The image display system of claim 8, wherein the first image is projected to a specific view point when the first optical reflector is at a corresponding position.

10. The image display system of claim 8, wherein the first optical reflector continuously moves in a predetermined pattern to redirect the multiple light signals towards a first combiner at a different angle of incidence caused by continuously moving of the first optical reflector.

11. The image display system of claim 8, wherein the first optical reflector is a one dimensional MEMS mirror, a two dimensional MEMS mirror, a polygon cylinder reflector, or a circular cylinder reflector.

12. The image display system of claim 8, wherein a light source of the first image projector is one laser, light emitting diode (LED), organic light emitting diode (OLED), superluminescent diode (SLD), liquid crystal on silicon (LCoS), or liquid crystal display (LCD), or any combination thereof.

13. The image display system of claim 8, wherein the first image projector is a laser beam scanning (LBS) projector or a digital light processing (DLP) projector.

14. The image display system of claim 8, further comprising a first collimator positioned between the first image projector and the first optical reflector to cause the motion directions of the light signals to become more aligned in a specific direction.

15. The image display system of claim 8, further comprising:
a support structure wearable on a head of the viewer;
wherein the first image projector, the second image projector, the first optical reflector and the second optical reflector are carried by the support structure; and
wherein the first combiner and the second combiner are carried by the support structure and positioned within a field of view of the viewer, wherein the pair of glasses has a prescription lens which carries the first combiner or the second combiner.

* * * * *